US011726286B2

(12) United States Patent
Filer et al.

(10) Patent No.: US 11,726,286 B2
(45) Date of Patent: Aug. 15, 2023

(54) FIBER OPTIC CABLE CONNECTOR AND ADAPTER HOUSING

(71) Applicant: Microsoft Technology Licensing, LLC, Redmond, WA (US)

(72) Inventors: Mark McKay Filer, Seattle, WA (US); Eric Clarence Peterson, Woodinville, WA (US); Jeffrey Lloyd Cox, Fall City, WA (US); William David Bragg, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/170,582

(22) Filed: Feb. 8, 2021

(65) Prior Publication Data
US 2022/0252810 A1   Aug. 11, 2022

(51) Int. Cl.
*G02B 6/44*   (2006.01)
*G02B 6/38*   (2006.01)

(52) U.S. Cl.
CPC ......... *G02B 6/4452* (2013.01); *G02B 6/3885* (2013.01); *G02B 6/4471* (2013.01)

(58) Field of Classification Search
CPC ...... G02B 6/44; G02B 6/4452; G02B 6/3885; G02B 6/4471
See application file for complete search history.

(56) References Cited

U.S. PATENT DOCUMENTS

| 5,600,748 | A | 2/1997 | Kosaka |
| 10,725,252 | B1 | 7/2020 | Leigh et al. |
| 2008/0214059 | A1 | 9/2008 | Rothermel et al. |
| 2017/0293092 | A1 | 10/2017 | Sano et al. |
| 2017/0307828 | A1* | 10/2017 | Elenbaas ............. G02B 6/3817 |
| 2018/0210153 | A1* | 7/2018 | Daily ................. G02B 6/3857 |
| 2019/0331862 | A1 | 10/2019 | Leigh et al. |

(Continued)

OTHER PUBLICATIONS

"Fiber Shuffle", Retrieved from: https://web.archive.org/web/20180823071043/https://global-sei.com/fiber_optic_interconnect/products/Fiber_Shuffle/, Aug. 23, 2018, 3 Pages.

(Continued)

*Primary Examiner* — Jennifer Doan
(74) *Attorney, Agent, or Firm* — Weaver IP L.L.C.

(57) ABSTRACT

The embodiments described herein are directed to a fiber optic cable and a fiber optic adapter housing. The cable comprises a connector body that houses a plurality of fiber portions. The connector body has a face comprising a plurality of rows of apertures for exposing respective ends of the fiber portions. Each aperture of a particular row are diagonally offset from nearest aperture(s) of an adjacent row. The housing comprises first slots having a first orientation and opposing second slots having a second orientation. The first slots are configured for the insertion of cables having the first orientation, and the second slots are configured for the insertion of cables having the second orientation. Such a configuration enables a shuffle function, where a device coupled to a cable inserted into a first slot is communicatively coupled to other devices each connected to a respective cable inserted into a respective second slot.

20 Claims, 14 Drawing Sheets

(56) References Cited

U.S. PATENT DOCUMENTS

2020/0264386 A1* 8/2020 Hodge ................ G02B 6/3676
2020/0301077 A1  9/2020 Leigh et al.

OTHER PUBLICATIONS

"FlexPlane Optical Flex Circuits", Retrieved from: https://www.molex.com/molex/products/family/flexplanetrade, Retrieved Date: Sep. 16, 2020, 4 Pages.

"OptoConnect Aggregation Fiber Shuffle Boxes", Retrieved from: https://www.molex.com/molex/products/family/optoconnect. Retrieved Date: Sep. 16, 2020, 4 Pages.

"Senko", Retrieved from: https://web.archive.org/web/20200608145016/https://www.senko.com/sn-connector/, Jun. 8, 2020, 8 Pages.

"International Search Report and Written Opinion Issued in PCT Application No. PCT/US22/013035", dated Apr. 20, 2022, 11 Pages.

* cited by examiner

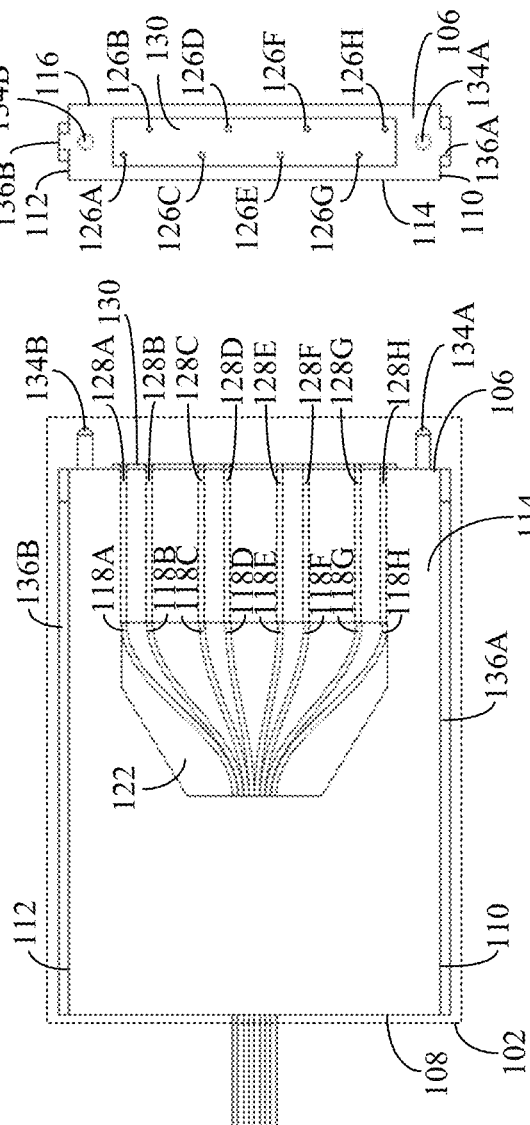
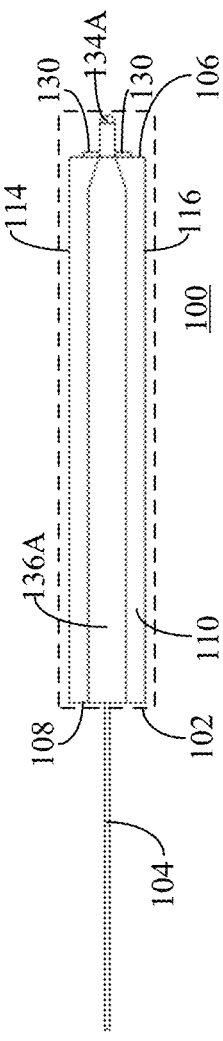
FIG. 1E  FIG. 1B  FIG. 1D  FIG. 1C

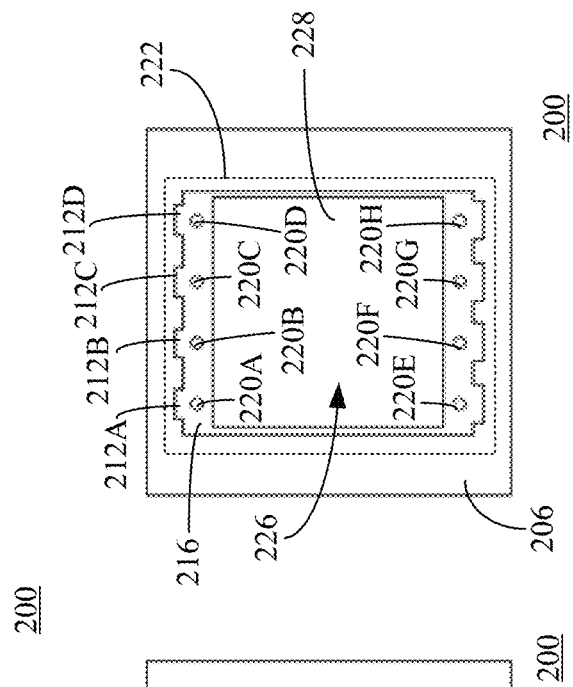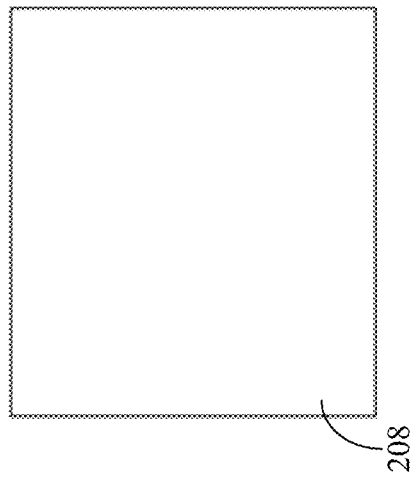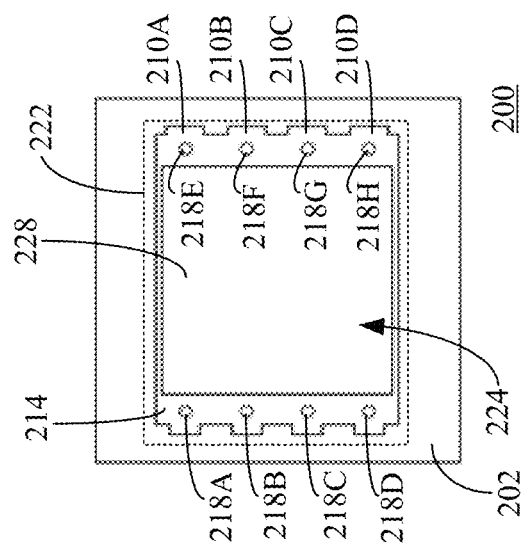
FIG. 2F
FIG. 2D
FIG. 2E
FIG. 2C

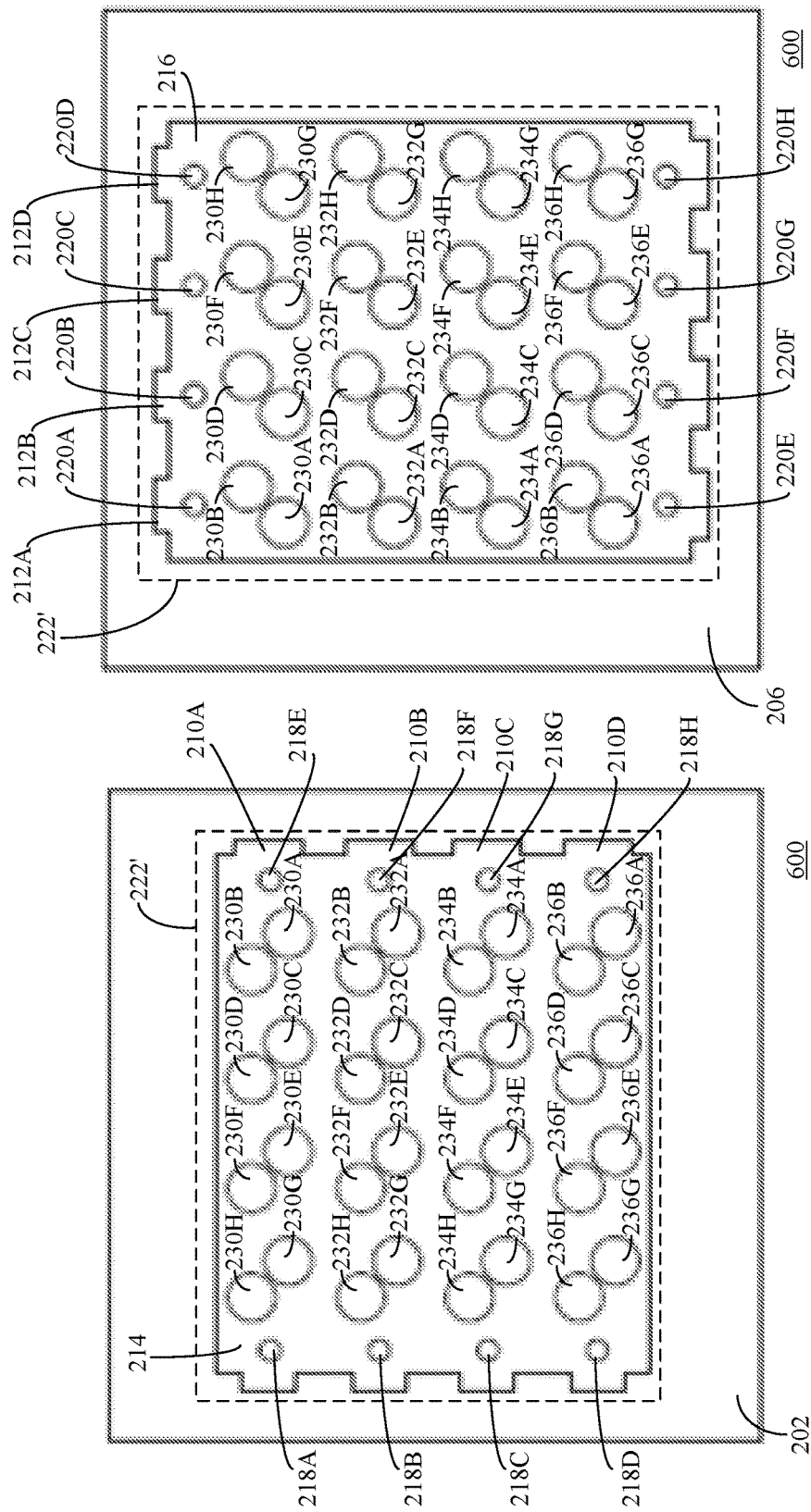

FIBER OPTIC CABLE CONNECTOR AND ADAPTER HOUSING

BACKGROUND

In data center networking applications, a parallel optical fiber infrastructure is heavily relied-upon as a means of providing connectivity between tiers of electronic switches and servers. In some instances, a given switch may be coupled to a plurality of servers, and vice versa, via such an infrastructure. Such an infrastructure is typically implemented using a patch panel, a pre-fabricated shuffle element in an optical shuffle module (or box), or via building out a cross-connect fabric with discrete duplex fibers. Such implementations are cumbersome to implement, are prone to increased insertion loss, and consume a large amount of space that is becoming increasingly crowded as capability demands increase.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The embodiments described herein are directed to a fiber optic cable and a fiber optic adapter housing. The fiber optic cable comprises a connector body that houses a plurality of fiber portions. The connector body has a face comprising a plurality of adjacent rows of apertures for exposing respective ends of the fiber portions, which enables communicative coupling with other fiber optic cables either via physical contact or expanded beam optical lensing. Each aperture of a particular row of apertures are diagonally offset from nearest aperture(s) of an adjacent row of apertures. The fiber optic adapter housing comprises a first receptacle and a second receptacle opposing the first receptacle. The first receptacle comprises a plurality of first slots having a first orientation. The second receptacle comprises a plurality of second slots having a second orientation that is different than the first orientation. The first slots are configured for the insertion of fiber optic cables having the first orientation, and the second slots are configured for the insertion of fiber optic cables having the second orientation. Such a configuration enables a shuffle function, in which a device (e.g., a network switch) coupled to a fiber optic cable inserted into a slot of the first receptacle is communicatively coupled to a plurality of other devices (e.g., servers) that are each connected to a fiber optic cable inserted into a respective slot of the second receptacle.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 1B shows a top view of a fiber optic cable assembly in accordance with an example embodiment.

FIG. 1C shows a rear view of a fiber optic cable assembly in accordance with an example embodiment.

FIG. 1D shows a front view of a fiber optic cable assembly in accordance with an example embodiment.

FIG. 1E shows a lateral view of a fiber optic cable assembly in accordance with an example embodiment.

FIG. 2C shows a front view depicting a front face of a fiber optic adapter housing in accordance with an example embodiment.

FIG. 2D shows a top view depicting a top face of a fiber optic adapter housing in accordance with an example embodiment.

FIG. 2E shows a rear view depicting a rear face of a fiber optic adapter housing in accordance with an example embodiment.

FIG. 2F shows a bottom view depicting a bottom face of a fiber optic adapter housing in accordance with an example embodiment.

FIG. 6A depicts a front view of a front face of a fiber optic adapter housing that supports expanded beam optical lensing in accordance with an example embodiment.

FIG. 6B depicts a rear view of a rear face of a fiber optic adapter housing 600 that supports expanded beam optical lensing in accordance with an example embodiment.

Figure 1A:
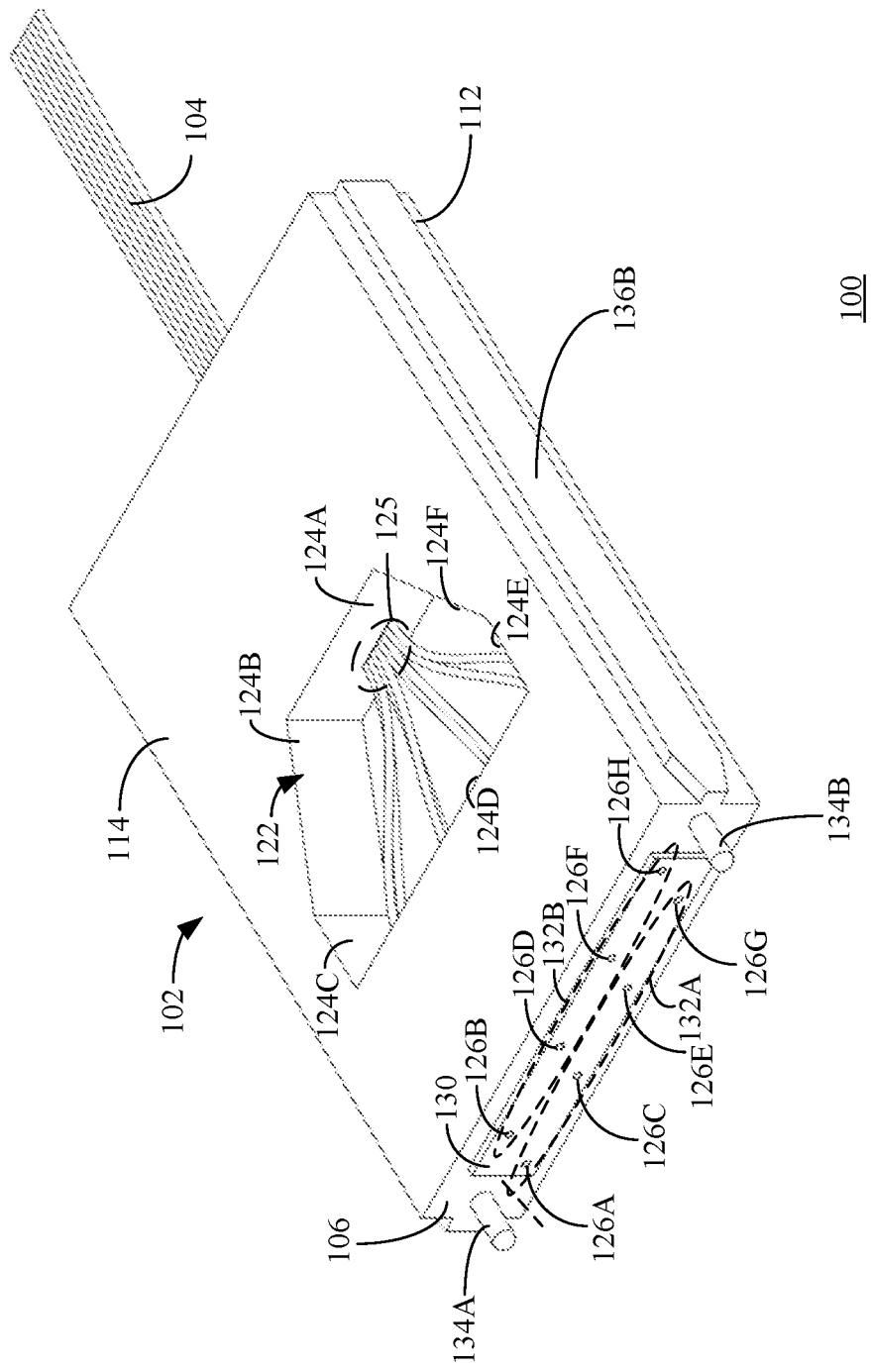
FIG. 1A shows a perspective view of a fiber optic cable assembly in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

The embodiments described herein are directed to a fiber optic cable and a fiber optic adapter housing. The fiber optic cable comprises a connector body that houses a plurality of fiber portions. The connector body has a face comprising a plurality of adjacent rows of apertures for exposing respective ends of the fiber portions, which enables communicative coupling with other fiber optic cables either via physical contact or expanded beam optical lensing. Each aperture of a particular row of apertures are diagonally offset from nearest aperture(s) of an adjacent row of apertures. The fiber optic adapter housing comprises a first receptacle and a second receptacle opposing the first receptacle. The first receptacle comprises a plurality of first slots having a first orientation. The second receptacle comprises a plurality of second slots having a second orientation that is different than the first orientation. The first slots are configured for the insertion of fiber optic cables having the first orientation, and the second slots are configured for the insertion of fiber optic cables having the second orientation. Such a configuration enables a shuffle function, in which a device (e.g., a network switch) coupled to a fiber optic cable inserted into a slot of the first receptacle is communicatively coupled to a plurality of other devices (e.g., servers) that are each connected to a fiber optic cable inserted into a respective slot of the second receptacle.

The embodiments described herein advantageously reduce the complexity, cost, operational burden of implementing an optical fiber infrastructure, and also reduce the total insertion loss by roughly half compared to that of a discrete shuffle element because the number of physical matings is reduced by half. Alternative implementations utilize complex fiber optic patch panels with discrete fibers, dedicated pre-fabricated optical shuffle modules, or require the building of a cross-connect fabric out of discrete duplex connectors to perform the desired shuffle function. Such approaches may perform the same function but at the expense of increased cost, space occupancy, and operational burden (i.e., installation and/or maintenance). Such approaches are more complex optical systems, and as such, lend themselves to increased risk of error in misconfiguration and network unavailability due to relative complexity and associated maintenance.

The embodiments described herein further differ from existing solutions by providing the shuffle functionality entirely within the connector and housing assemblies themselves, obviating the need for any kind of dedicated shuffle device. Moreover, the connectors and housing described herein are keyed, thereby enabling the foolproof connectivity between devices (such as switches and servers), minimizing the operational effort applied to infrastructure management.

FIGS. 1A-1E show a fiber optic cable assembly 100 in accordance with an example embodiment. In particular, FIG. 1A shows a perspective view of fiber optic cable assembly 100, FIG. 1B shows a top view of fiber optic cable assembly 100, FIG. 1C shows a rear view of fiber optic cable assembly 100, FIG. 1D shows a front view of fiber optic cable assembly 100, and FIG. 1E shows a lateral or side view of fiber optic cable assembly 100. As shown in FIGS. 1A, 1B, and 1E, fiber optic cable assembly 100 includes a connector body 102 (or connector) and a portion of a fiber optic cable 104. As shown in FIGS. 1A-1E, connector body 102 comprises a front face 106, a rear face 108 that opposes front face 106, a first lateral face 110, a second lateral face 112 that opposes first lateral face 110, a top face 114, and a bottom face 116 that opposes top face 114. First lateral face 110 and second lateral face 112 may be orthogonal to front face 106 and rear face 108. Front face 106 may comprise a protruding face 130.

Fiber optic cable 104 may comprise a plurality of fiber portions 118A-118H. Each of fiber portions 118A-118H may comprise a core that is protected by a cladding, buffer coating, and/or an outer jacket. The core may comprise a thin strand of glass (e.g., 10-600 microns). The core serves as the medium through which light pulses are transmitted via devices (e.g., network switches, servers, etc.) coupled thereto. The cladding may surround the core, reflects the light back into the core, and eliminates light from escaping the cable. The cladding may be made of a material having a lower refractive index than that of the core. Examples of such a material include glass, plastic, or a combination thereof. The thickness of the cladding may be between 125-630 microns. The outer jacket serves as a protective layer. The outer jacket may be made of polyurethane, polyvinyl chloride (PVC), and/or the like. The thickness of the jacket may be between 250-1040 microns.

As shown in FIG. 1C, rear face 108 may comprise an aperture 120. Aperture 120 may be formed to receive a first end of fiber optic cable 104. As shown in FIGS. 1A and 1B, top face 114 and/or bottom face 116 may comprise an aperture 122, which exposes one or more inner faces 124A-124F of connector body 102. Inner face 124A may comprise an aperture 125 formed to receive the first end of fiber optic cable 104. As shown in FIG. 1B, a plurality of vias 128A-128H may run through a portion of connector body 102 between protruding face 130 and inner face 124D. Vias 128A-128H may be exposed via a first row 132A of apertures 126A, 126C, 126E, and 126G and an adjacent second row 132B of apertures 126B, 126D, 126F, and 126H of protruding face 130 and corresponding apertures (not shown) of inner face 124D. The apertures of inner face 124D are aligned with aperture 126A-126H of front face 106. Vias 128A-128H may be configured to house fiber portions 118A-118H, respectively.

Aperture 120 may be utilized during manufacturing to route fiber portion 118A through a respective aperture of inner face 124D, via 128A, and/or aperture 126A, route fiber portion 118B through a respective aperture of inner face 124D, via 128B, and/or aperture 126B, route fiber portion 118C through a respective aperture of inner face 124D, via 128C, and/or aperture 126C, route fiber portion 118D through a respective aperture of inner face 124D, via 128D, and/or aperture 126D, route fiber portion 118E through a respective aperture of inner face 124D, via 128E, and/or aperture 126E, route fiber portion 118F through a respective aperture of inner face 124D, via 128F, and/or aperture 126F, route fiber portion 118G through a respective aperture of inner face 124D, via 128G, and/or aperture 126G, and route fiber portion 118H through a respective aperture of inner face 124D, via 128H, and/or aperture 126H. A respective end of fiber portions 118A-118H may be flushed with protruding face 130 so that fiber portions 118A-118H do not protrude outward from protruding face 130. It is noted that while aperture 122 is depicted as being trapezoidal, aperture 120 may comprise any other shape suitable for routing fiber portions 118A-118H through apertures of inner face 124D, vias 128A-128H and/or apertures 126A-126H, such as but not limited to, rectangular, circular, elliptical, triangular, etc.

Each of apertures 126A, 126C, 126E, and 126G of first row 132A may be diagonally offset from a nearest one or more apertures 126B, 126D, 126F, and 126H of second row 132B. As shown in FIGS. 1A and 1D, each of apertures 126A-126H may comprise one or more most nearest apertures. For example, aperture 126A of first row 132A has one nearest adjacent aperture in second row 132B (i.e., aperture 126B) and is diagonally offset therefrom. However, aperture 126B of second row 132B has two nearest adjacent apertures in first row 132A (i.e., aperture 126A and aperture 126C). In such a case, aperture 126B is diagonally offset from aperture 126A and aperture 126C. Each of apertures 126A-126H may be diagonally offset from its nearest aperture(s) in its adjacent row by an angle of approximately 45 degrees. The apertures of inner face 124D may be diagonally offset in a similar manner.

In accordance with an embodiment, fiber portions 118A and 118B are a first transmit/receive fiber pair, where one of fiber portions 118A and 118B is utilized for transmitting data and another one of fiber portions 118A and 118B is utilized for receiving data. Fiber portions 118C and 118D are a second transmit/receive fiber pair, where one of fiber portions 118C and 118D is utilized for transmitting data and another one of fiber portions 118C and 118D is utilized for receiving data. Fiber portions 118E and 118F are a third transmit/receive fiber pair, where one of fiber portions 118E and 118F is utilized for transmitting data and another one of fiber portions 118E and 118F is utilized for receiving data. Fiber portions 118G and 118H are a fourth transmit/receive fiber pair, where one of fiber portions 118G and 118H is utilized for transmitting data and another one of fiber portions 118G and 118H is utilized for receiving data.

It is noted that while connector body 102 is shown as comprising four transmit/receive fiber pairs housed in eight apertures 126A-126H, connector body 102 may be configured to comprise any number of transmit/receive fiber pairs and corresponding apertures and vias. It is further noted that while connector body 102 is shown as housing eight fiber portions 118A-118H, connector 102 may be configured to house any number of fiber portions, where more than two fiber portions are diagonally offset at an angle from its nearest fiber portion(s) in an adjacent row. For instance, rather than having four sets of two fiber portions (i.e., fiber portions 118A and 118B, fiber portions 118C and 118D, fiber portions 118E and 118F, and fiber portions 118G and 118H), each set may comprise more than two fiber portions (e.g., four fiber portions, eight fiber portions, twelve fiber portions, etc.), where each of the fiber portions in the set are diagonally offset at an angle from its nearest fiber portions(s) in an adjacent row. That is, more than two rows 132A and 132B of apertures housing respective fiber portions may be included in protruding face 130.

As shown in FIGS. 1A, 1B, 1D, and 1E, front face 106 may comprise one or more protruding members (or guide pins) 134A and/or 134B. Members 134A and/or 134B protrude outward from front face 106. Members 134A and/or 134B are configured to mate with corresponding apertures of a fiber optic adapter housing, as will be described below with reference to FIGS. 2A-2F. It is noted that while members 134A and/or 134B are shown as being cylindrical, members 134A and/or 134B may alternatively be rectangular, triangular, or have any shape and/or length that is suitable for mating with the fiber optic adapter housing.

As shown in FIGS. 1A-1E, lateral face 110 and/or 112 may be keyed to prevent the mating of connector 102 with the fiber optic adapter housing in an incorrect orientation. For example, lateral face 110 and/or 112 may comprise keyed portions 136A and/or 136B. Keyed portion 136A may comprise a raised portion that protrudes outwardly from and extends along lateral face 110, and keyed portion 136B may comprise a raised portion that protrudes outwardly from and extends along lateral face 112. It is noted that keying techniques described above are purely exemplary and that connector body 102 may be keyed in a different manner using techniques known in the relevant art(s).

It is it noted that while FIGS. 1A-1E depicts a respective end of fiber optic cable 104 as being housing in connector body 102, another end of fiber optic cable may be housed in connector body that is similar to connector body 102 or in a different type of connector. Examples of such a connector include, but are not limited to, a Multi-Fiber Push On (MPO) connector, a Multi-Fiber Pull Off (MTP) connector, a straight tip (ST) connector, a ferrule connector (FC), a subscriber connector (SC), a Lucent® Connector (LC), etc.

In accordance with an embodiment, fiber optic cable 104 supports expanded beam optical lensing. In accordance with such an embodiment, a lens is placed at the end of each fiber portion of fiber portions 118A-118H to collimate and refocus the light from the transmitting fiber into the receiving fiber. The lenses are generally either ball lenses or graded index (GRIN) lenses. In an embodiment in which a ball lens is utilized, the light from the source changes direction at the curved boundaries, and travels through the inside of the lens in straight lines. In an embodiment in which a GRIN lens is utilized, the light curves through the inside of the GRIN lens.

The use of expanded beam optic interfaces results in reduced signal loss resulting from contamination at the optic interface. The lens design also facilitates cleaning and removes physical contact between the transmitting fiber and the receiving, as the light path travels over an air gap. Lack of physical contact advantageously eliminates the mechanical wear found in physical contact connectors, allowing more connector mating cycles.

Figure 1G:
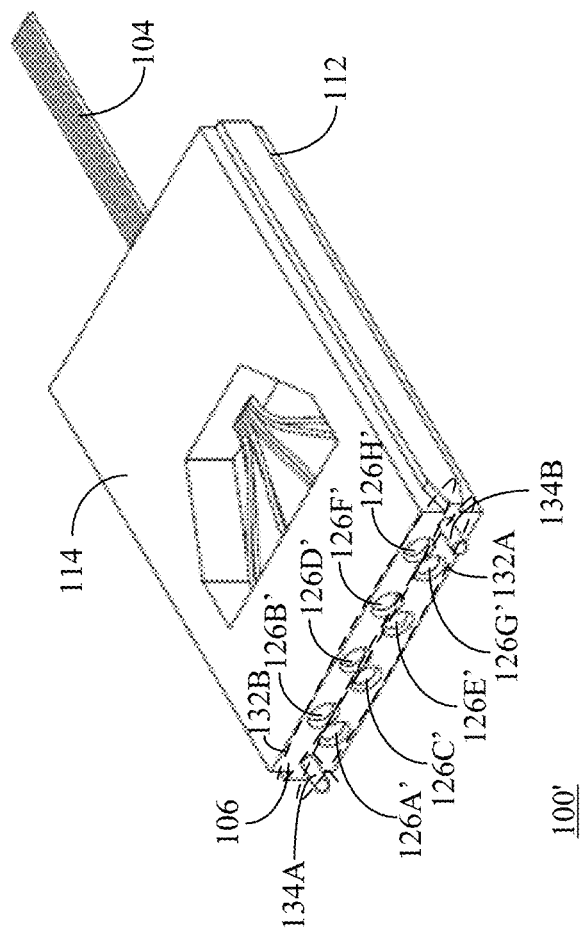
FIG. 1G shows a perspective view of a fiber optic cable assembly configured to utilize expanded beam optical lensing in accordance with an example embodiment.
Figure 1F:
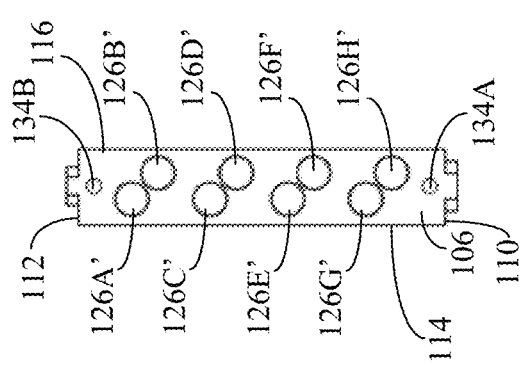
FIG. 1F shows a front view of a fiber optic cable assembly configured to utilize expanded beam optical lensing in accordance with an example embodiment.

FIGS. 1F-1G depict a fiber optic cable assembly 100' configured to utilize expanded beam optical lensing in accordance with an example embodiment. In particular, FIG. 1F depicts a front view of fiber optic cable assembly 100', and FIG. 1G depicts a perspective view of fiber optic cable assembly 100'. Fiber optic cable assembly 100' is similar to fiber optic cable assembly 100 described above with reference to FIGS. 1A-1E. However, in fiber optic cable assembly 100', the apertures of front face 106 (shown as apertures 126A'-126H') are relatively larger than apertures 126A-126H (as shown in FIGS. 1A and 1E). In particular, apertures 126A'-126H' (also referred herein as "lens apertures") are configured and formed to receive respective lenses, which are relatively larger than the ends of fiber portions 118A-118N. It is also noted that front face 106 no longer comprises protruding face 130.

Each of apertures 126A', 126C', 126E', and 126G' of first row 132A may be diagonally offset from a nearest one or more apertures 126B', 126D', 126F', and 126H' of second row 132B. As shown in FIGS. 1F and 1G, each of apertures 126A'-126H' may comprise one or more most nearest apertures. For example, aperture 126A' of first row 132A has one most nearest aperture (i.e., aperture 126B') in second row 132B and is diagonally offset therefrom. However, aperture 126B' of second row 132B has two most adjacent apertures (i.e., aperture 126A' and aperture 126C'). In such a case, aperture 126B' is diagonally offset from aperture 126A' and aperture 126C'. Each of apertures 126A'-126H' may be diagonally offset from its nearest aperture(s) in its adjacent row by an angle of approximately 45 degrees.

Figure 2A:
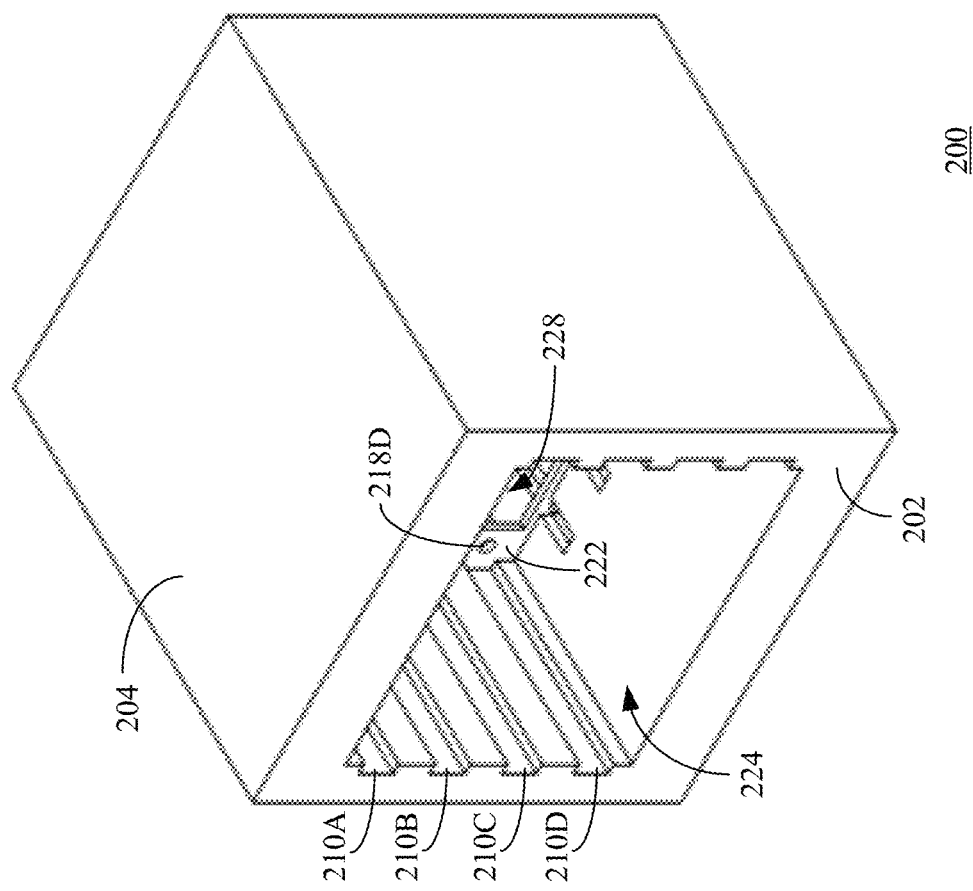
FIG. 2A shows a first perspective view of a fiber optic adapter housing in accordance with an example embodiment.
Figure 2B:
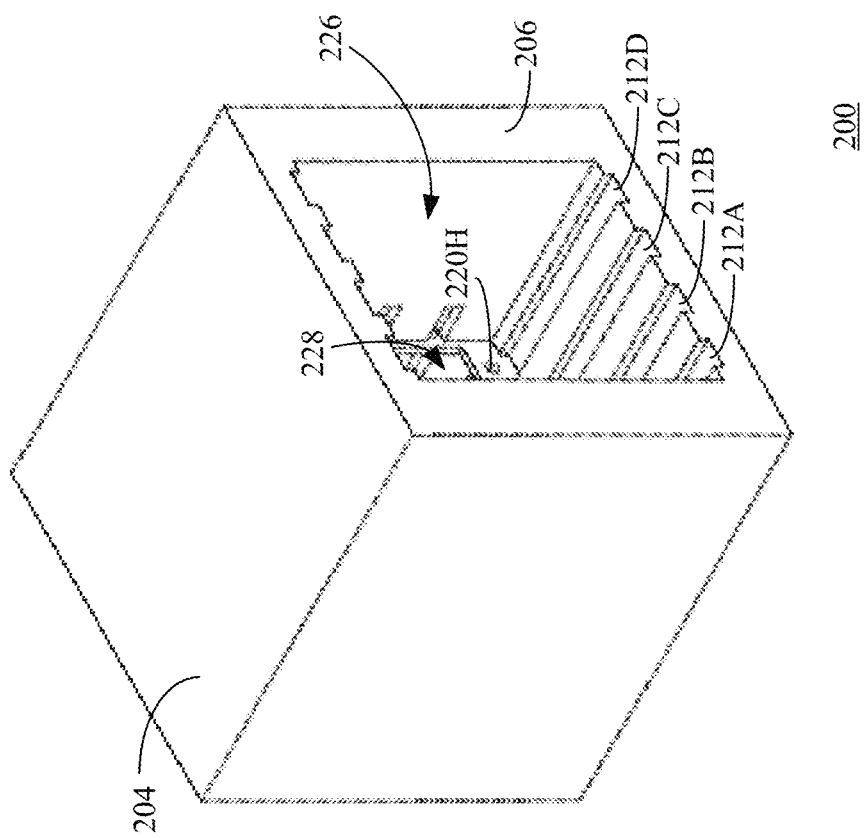
FIG. 2B shows a second perspective view of a fiber optic adapter housing in accordance with an example embodiment.

FIGS. 2A-2F show a fiber optic adapter housing 200 in accordance with an example embodiment. In particular, FIG. 2A shows a first perspective view of fiber optic adapter housing 200, FIG. 2B shows a second perspective view of fiber optic adapter housing 200, FIG. 2C shows a front view depicting a front face 202 of fiber optic adapter housing 200, FIB. 2D shows a top view depicting a top face 204 of fiber optic adapter housing 200, FIG. 2E shows a rear view depicting a rear face 206 (that opposes front face 202) of fiber optic adapter housing 200, and FIG. 2F shows a bottom view depicting a bottom face 208 (that opposes top face 204) of fiber optic adapter housing 200. As shown in FIGS. 2A, 2B, 2C, and 2E, fiber optic adapter housing 200 comprises a first receptacle 224 and a second receptacle 226. Second receptacle 226 opposes first receptacle 224 such that second receptacle 226 faces the opposite direction in which first receptacle 224 faces.

As shown in FIGS. 2A and 2C, first receptacle 224 comprises a plurality of slots 210A-210D. Each of slots 210A-210D is formed to receive and house a respective fiber optic cable assembly (e.g., fiber optic cable assembly 100), as described above with reference to FIGS. 1A-1E. For instance, each of slots 210A-210D may be formed to receive fiber optic cable assembly 100 in accordance with keyed portion(s) 136A and/or 136B to ensure that fiber optic cable assembly 100 is inserted having a proper orientation.

As shown in FIGS. 2B and 2D, second receptacle 226 comprises a plurality of slots 212A-212D. Each of slots 212A-212D is formed to receive and house a respective fiber optic cable assembly (e.g., fiber optic cable assembly 100), as described above with reference to FIGS. 1A-1E. For instance, each of slots 212A-212D may be formed to receive fiber optic cable assembly 100 in accordance with keyed portion(s) 136A and/or 136B to ensure that fiber optic cable assembly 100 is inserted having a proper orientation. As shown in FIGS. 2B, 2C, and 2E, each of slots 212A-212D are configured to receive a respective fiber optic cable assembly 100 in a first orientation that is different than a second orientation in which each of slots 210A-210D receive a respective fiber optic cable assembly 100. In accordance with embodiment, the first orientation is orthogonal to the second orientation. For example, as shown in FIGS. 2A and 2C, each of slots 210A-210D are configured to receive a respective fiber optic cable assembly 100 with a horizontal orientation, whereas, as shown in FIGS. 2B and 2E, each of slots 212A-212D are configured to receive a respective fiber optic cable assembly 100 with a vertical orientation (i.e., fiber optic cable assemblies inserted into slots 212A-212D are rotated approximately 90 degrees with respect to the fiber optic cable assemblies inserted into slots 210A-210D).

It is noted, however, that in certain embodiments, other orientations for slots 212A-212D may be supported. For instance, slots 212A-212D may be oriented such that fiber optic cable assemblies inserted thereto are rotated approximate 0 degrees or 270 degrees with respect to fiber optic cable assemblies inserted into slots 210A-210D (e.g., to implement signal pass-through or a signal polarity flip, respectively). In accordance with such embodiments, the connector bodies of such assemblies and/or adapter housing may be keyed appropriately to ensure that such connectors are inserted into the housing in the proper orientation.

As shown in FIGS. 2C and 2E, fiber optic adapter housing 200 further comprises a mounting plate 222 having a first face 214, a second face 216 that opposes first face 214, and an aperture 228. Mounting plate 222 comprises a plurality of apertures 218A-218H and a plurality of apertures 220A-220H. Each of apertures 218A-218H and apertures 220A-220H is configured and formed to receive a respective protruding member 134A or 134B of fiber optic cable assembly 100 (as shown in FIG. 1) and detachably couple a corresponding fiber optic cable assembly 100 to mounting plate 222. For example, apertures 218A-218H, apertures 220A-220H, and protruding members 134A and 134B may be formed to achieve an interference fit (also known as a press fit or friction fit) when protruding members 134A and 134B are forcibly pushed through corresponding apertures of 218A-218H and apertures 220A-220H in a direction towards mounting plate 222. A respective fiber optic cable assembly 100 coupled to mounting plate 222 may be detached by pulling (or applying a force) in a direction away from mounting plate 222.

For example, aperture 218A is configured to receive protruding member 134A of a first fiber optic cable assembly 100, and aperture 218E is configured to receive protruding member 134B of the first fiber optic cable assembly 100. The first fiber optic cable assembly 100 inserted and received in slot 210A is configured to be detachably coupled to first face 214 of mounting plate 222 via protruding members 134A and 134B being inserted into apertures 218A and 218E, respectively.

Aperture 218B is configured to receive protruding member 134A of a second fiber optic cable assembly 100, and aperture 218F is configured to receive protruding member 134B of the second fiber optic cable assembly 100. The second fiber optic cable assembly 100 inserted and received in slot 210B is configured to be detachably coupled to first face 214 of mounting plate 222 via protruding members 134A and 134B being inserted into apertures 218B and 218F, respectively.

Aperture 218C is configured to receive protruding member 134A of a third fiber optic cable assembly 100, and aperture 218G is configured to receive protruding member 134B of the third fiber optic cable assembly 100. The third fiber optic cable assembly 100 inserted and received in slot 210C is configured to be detachably coupled to first face 214 of mounting plate 222 via protruding members 134A and 134B being inserted into apertures 218C and 218F, respectively.

Aperture 218D is configured to receive protruding member 134A of the fourth fiber optic cable assembly 100, and aperture 218H is configured to receive protruding member 134B of the fourth fiber optic cable assembly 100. The fourth fiber optic cable assembly 100 inserted and received in slot 210D is configured to be detachably coupled to first face 214 of mounting plate 222 via protruding members 134A and 134B being inserted into apertures 218D and 218H, respectively.

Similarly, aperture 220A is configured to receive protruding member 134A of a fifth fiber optic cable assembly 100, and aperture 220E is configured to receive protruding member 134B of the fifth fiber optic cable assembly 100. The fifth fiber optic cable assembly 100 inserted and received in slot 212A is configured to be detachably coupled to second face 216 of mounting plate 222 via protruding members 134A and 134B being inserted into apertures 220A and 220E, respectively.

Aperture 220B is configured to receive protruding member 134A of a sixth fiber optic cable assembly 100, and aperture 220F is configured to receive protruding member 134B of the sixth fiber optic cable assembly 100. The sixth fiber optic cable assembly 100 inserted and received in slot 212B is configured to be detachably coupled to second face 216 of mounting plate 222 via protruding members 134A and 134B being inserted into apertures 220B and 220F, respectively.

Aperture 220C is configured to receive protruding member 134A of a seventh fiber optic cable assembly 100, and aperture 220G is configured to receive protruding member 134B of the seventh fiber optic cable assembly 100. The seventh fiber optic cable assembly 100 inserted and received in slot 212C is configured to be detachably coupled to second face 216 of mounting plate 222 via protruding members 134A and 134B being inserted into apertures 220C and 220G, respectively.

Aperture 220D is configured to receive protruding member 134A of an eighth fiber optic cable assembly 100, and aperture 220H is configured to receive protruding member 134B of the eighth fiber optic cable assembly 100. The eighth fiber optic cable assembly 100 inserted and received in slot 212D is configured to be detachably coupled to second face 216 of mounting plate 222 via protruding members 134A and 134B being inserted into apertures 220D and 220H, respectively.

Aperture 228 is configured and formed to expose protruding face 130 of each fiber optic cable assembly 100 inserted into slots 210A-210D and slots 212A-212D of fiber optic adapter housing 200. This enables fiber portions 118A-118H exposed via apertures 126A-128H of protruding face 130 of respective fiber optic cable assemblies 100 inserted via slots 210A-210H to be interfaced with and communicatively coupled to fiber portions 118A-118H exposed via apertures 126A-128H of protruding face 130 of respective fiber optic cable assemblies 100 inserted via slots 212A-212H.

Figure 3A:
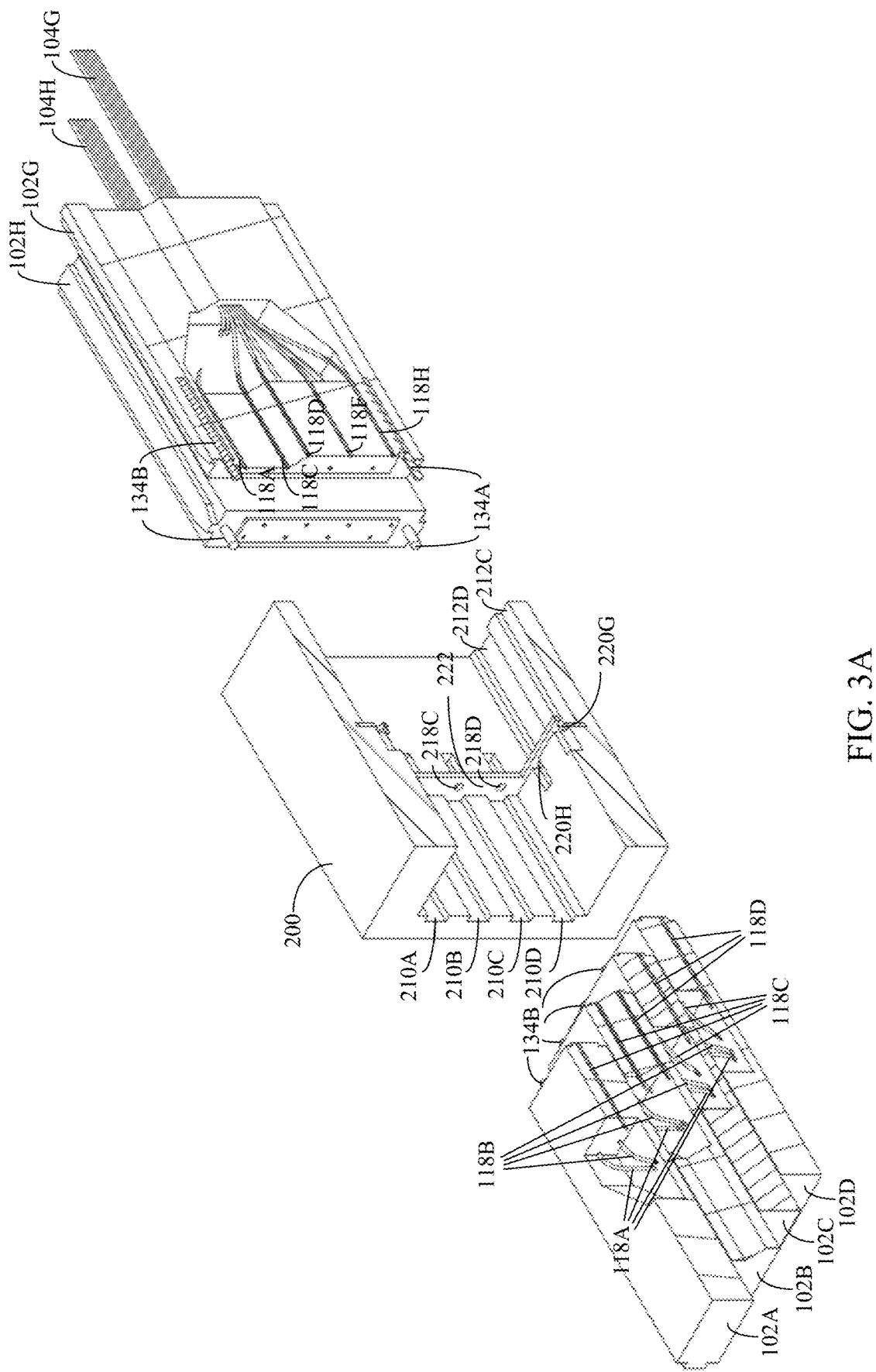
FIG. 3A shows a first cross-sectional perspective view of a system in which connectors are to be received by and inserted into a fiber optic adapter housing in accordance with an example embodiment.
Figure 3B:
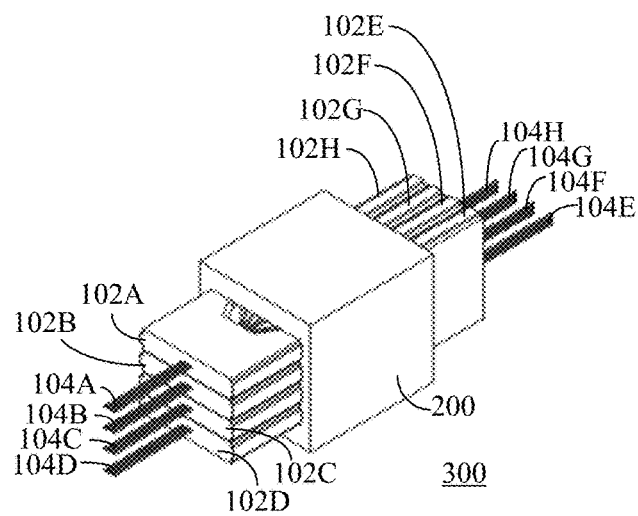
FIG. 3B shows a perspective view of a system in which connectors are received by and inserted into a fiber optic adapter housing in accordance with an example embodiment.
Figure 3C:
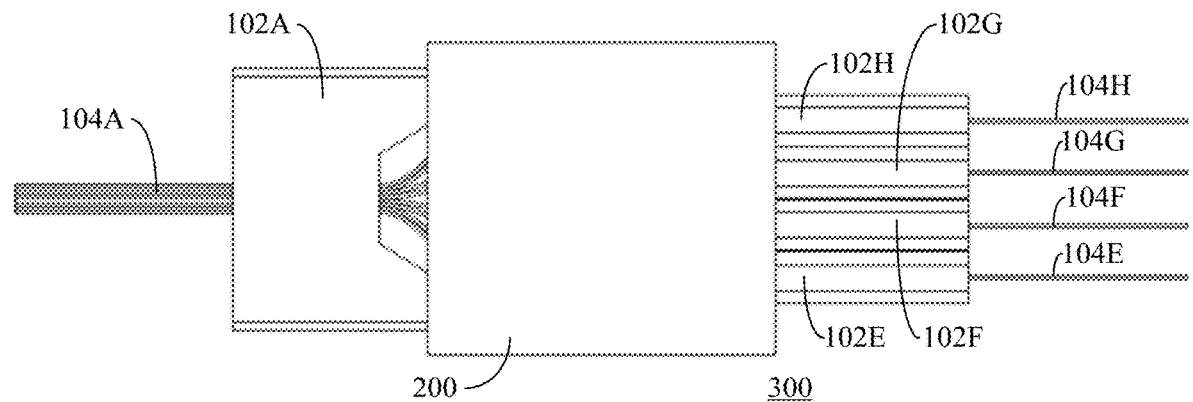
FIG. 3C shows a top view of a system in which connectors are received by and inserted into a fiber optic adapter housing in accordance with an example embodiment.
Figure 3D:
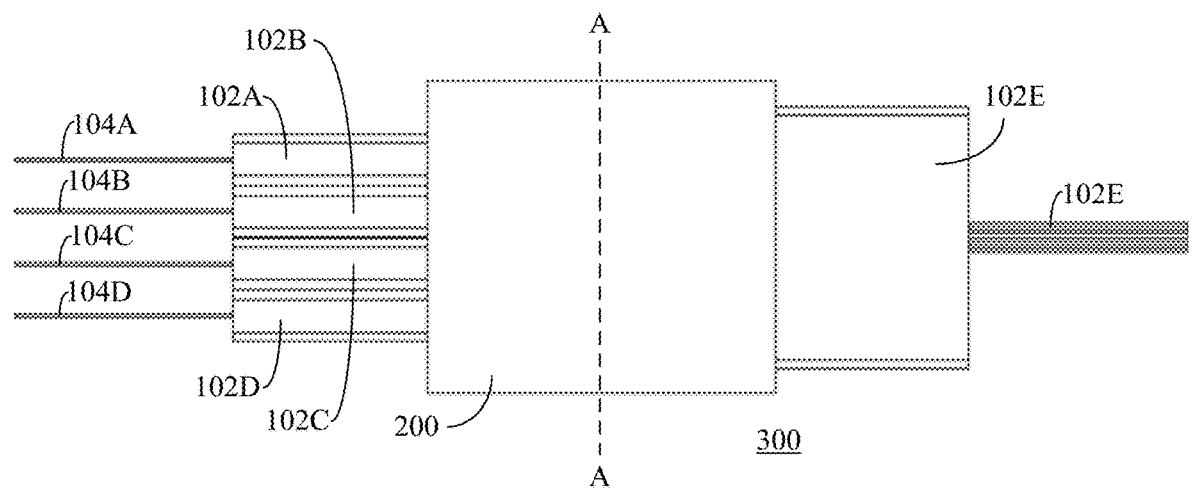
FIG. 3D shows a lateral view of a system in which connectors are received by and inserted into a fiber optic adapter housing in accordance with an example embodiment.
Figure 3E:
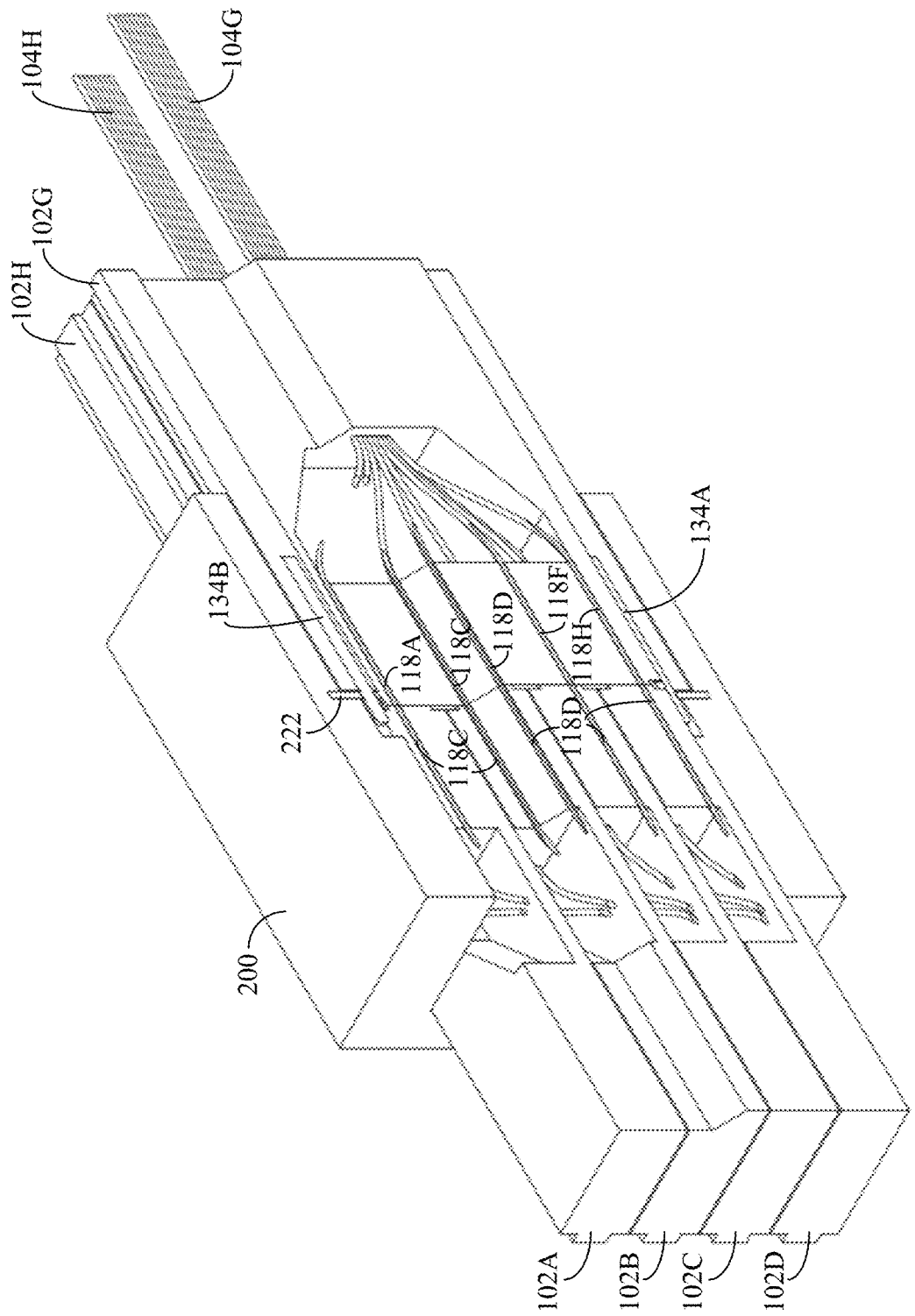
FIG. 3E shows a cross-sectional perspective view of a system in which connectors are received by and inserted into a fiber optic adapter housing in accordance with an example embodiment.

FIGS. 3A-3E show a system 300 comprising fiber optic adapter housing 200 and a plurality of fiber optic connectors 102A-102H in accordance with example embodiments. In particular, FIG. 3A shows a first cross-sectional perspective view of system 300 in which connectors 102A-102D and connectors 102G-102H are to be received by and inserted into fiber optic adapter housing 200, FIG. 3B shows a perspective view of system 300 in which connectors 102A-102D and connectors 102E-102H are received by and inserted into fiber optic adapter housing 200, FIG. 3C shows a top view of system 300 in which connectors 102A-102D and connectors 102E-102H are received by and inserted into fiber optic adapter housing 200, FIG. 3D shows a lateral view of system 300 in which connectors 102A-102D and connectors 102E-102H are received by and inserted into fiber optic adapter housing 200, and FIG. 3E shows a cross-sectional perspective view of system 300 in which connectors 102A-102D and connectors 102G-102H are received by and inserted into fiber optic adapter housing 200.

As shown in FIG. 3A, connector 102A of a first fiber optic cable assembly is to be received by and inserted into slot 210A, connector 102B of a second fiber optic cable assembly is to be received by and inserted into slot 210B, connector 102C of a third fiber optic cable assembly is to be received by and inserted into slot 210C, and connector 102D of a fourth fiber optic cable assembly is to be received by and inserted into slot 210D. Similarly, connector 102G of a fifth fiber optic cable assembly is to be received by and inserted into slot 212C, and a connector 102H of a sixth fiber optic cable assembly is to be received and inserted into slot 212D. Additional connectors that are to be received and inserted into slots 212A and 212B (i.e., connectors 102E and 102F) are not shown due the cross-sectional nature of view depicted in FIG. 3A.

When inserting connectors 102A-102D into respective slots 210A-210D, protruding members (e.g., protruding members 134B) of connectors 102A-102D are inserted into corresponding apertures of mounting plate 222. For example, as shown in FIG. 3A, protruding member 134B of connector 102C is inserted into aperture 218C of mounting plate 222, and protruding member 134B of connector 102D is inserted into aperture 218D of mounting plate 222. The apertures in which protruding members 134A of connectors 102A-102D and protruding members 134B of connectors 102A and 102B are inserted are not visible in the view depicted in FIG. 3A. When inserting connectors 102G-102H into respective slots 212C-212D, protruding members of connectors 102G-102H are inserted into corresponding apertures of mounting plate 222. For example, as shown in FIG. 3A, protruding member 134A of connector 102G is inserted into aperture 220G of mounting plate 222, and protruding member 134A of connector 102H is inserted into aperture 220H of mounting plate 222. The apertures in which protruding members 134 of connectors 102G and 102H are inserted are not visible in the view depicted in FIG. 3A.

As shown in FIGS. 3B-3D, connectors 102A-102D have been inserted into corresponding slots 210A-210D (not visible) and connectors 102E-102H have been inserted into corresponding slots 212A-212D (not visible). As further shown in FIGS. 3B-3D, connectors 102A-102D have been inserted into slots 210A-210D in accordance with a first orientation (e.g., a horizontal orientation), and connectors 102E-102H have been inserted into slots 212A-212D in accordance with a second orientation that is orthogonal to the first orientation (e.g., a vertical orientation).

As shown in FIG. 3E, respective fiber portions of connectors 102A-102D are interfaced with (e.g., physically contacting) and communicatively coupled to respective fiber portions of connectors 102E-102H. As visible in FIG. 3E, fiber portion 118C of connector 102A is interfaced with and communicatively coupled to fiber portion 118A of connector 102G, fiber portion 118C of connector 102B is interfaced with and communicatively coupled to fiber portion 118C of connector 102G, fiber portion 118D of connector 102B is interfaced with and communicatively coupled to fiber portion 118D of connector 102G, fiber portion 118D of connector 102C is interfaced with and communicatively coupled to fiber portion 118F of connector 102G, and fiber portion 118D of connector 102D is interfaced with and communicatively coupled to fiber portion 118H of connector 102G.

Figure 4:
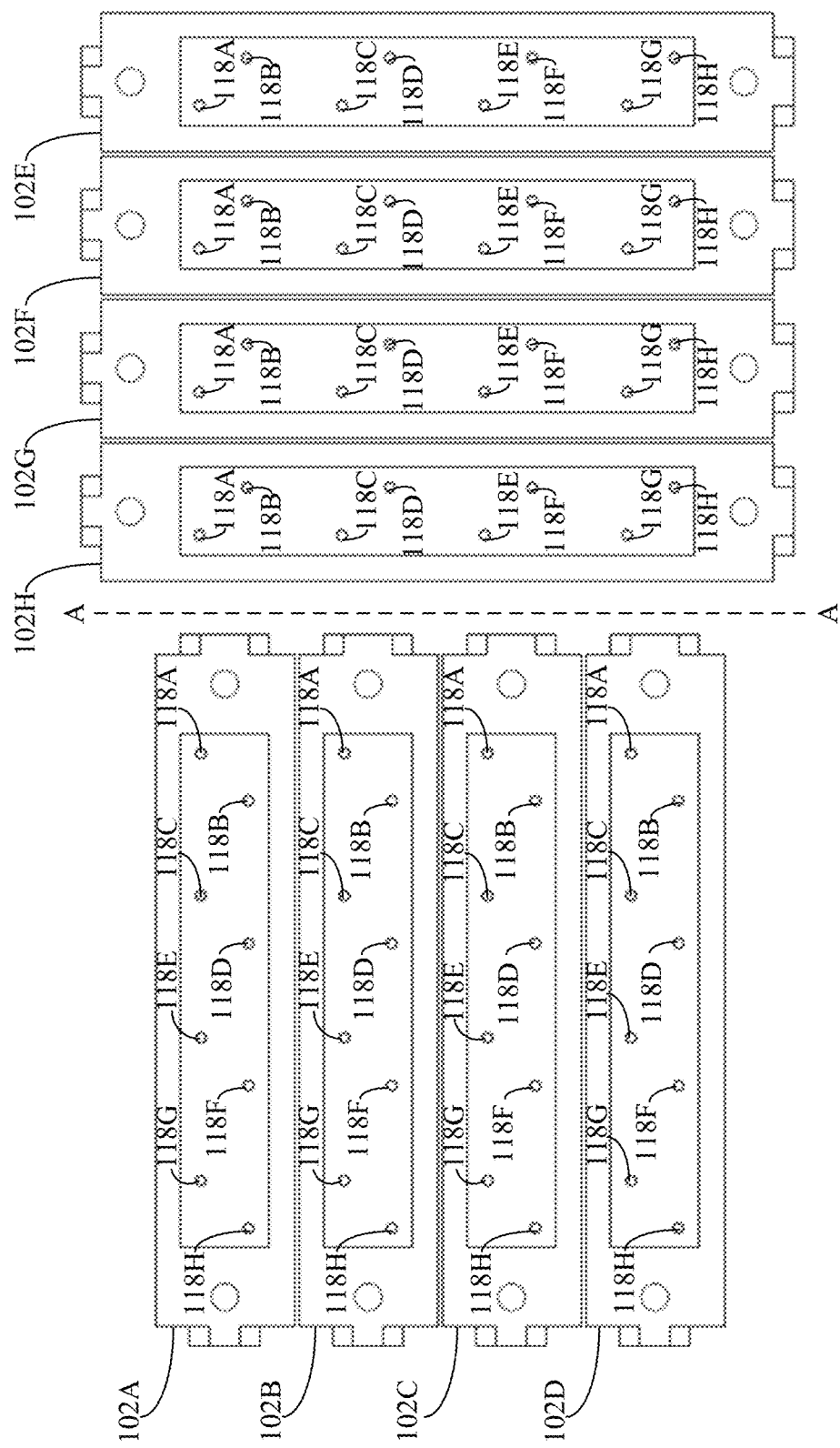
FIG. 4 depicts a cross-sectional view of connectors along an A-A axis depicted in FIG. 3D in accordance with an example embodiment.

FIG. 4 depicts a cross-sectional view of connectors 102A-102H along the A-A axis depicted in FIG. 3D in accordance with an example embodiment. FIG. 4 illustrates the manner in which various fiber portions of connectors 102A-102H are interfaced and coupled. When connectors 102A-102H are inserted into fiber optic adapter housing 200, fiber portion 118A of connector 102A is interfaced with and communicatively coupled to fiber portion 118A of connector 102H, fiber portion 118B of connector 102A is interfaced with and communicatively coupled to fiber portion 118B of connector 102H, fiber portion 118C of connector 102A is interfaced with and communicatively coupled to fiber portion 118A of connector 102G, fiber portion 118D of connector 102A is interfaced with and communicatively coupled to fiber portion 118B of connector 102G, fiber portion 118E of connector 102A is interfaced and communicatively coupled to fiber portion 118A of connector 102F, fiber portion 118F of connector 102A is interfaced with and communicatively coupled to fiber portion 118B of connector 102F, fiber portion 118G of connector 102A is interfaced with and communicatively coupled to fiber portion 118A of connector 102E, fiber portion 118H of connector 102A is interfaced with and communicatively coupled to fiber portion 118B of connector 102E, fiber portion 118A of connector 102B is interfaced with and communicatively coupled to fiber portion 118C of connector 102H, fiber portion 118B of connector 102B is interfaced with and communicatively coupled to fiber portion 118D of connector 102H, fiber portion 118C of connector 102B is interfaced with and communicatively coupled to fiber portion 118C of connector 102G, fiber portion 118D of connector 102B is interfaced with and communicatively coupled to fiber portion 118D of connector 102G, fiber portion 118E of connector 102B is interfaced with and communicatively coupled to fiber portion 118C of connector 102F, fiber portion 118F of connector 102B is interfaced with and communicatively coupled to fiber portion 118D of connector 102F, fiber portion 118G of connector 102B is interfaced with and communicatively coupled to fiber portion 118C of connector 102E, fiber portion 118H of connector 102B is interfaced with and communicatively coupled to fiber portion 118D of connector 102E, fiber portion 118A of connector 102C is interfaced with and communicatively coupled to fiber portion 118E of connector 102H, fiber portion 118B of connector 102C is interfaced with and communicatively coupled to fiber portion 118F of connector 102H, fiber portion 118C of connector 102C is interfaced with and communicatively coupled to fiber portion 118E of connector 102G, fiber portion 118D of connector 102C is interfaced with and communicatively coupled to fiber portion 118F of connector 102G, fiber portion 118E of connector 102C is interfaced with and communicatively coupled to fiber portion 118E of connector 102F, fiber portion 118F of connector 102C is interfaced with and communicatively coupled to fiber portion 118F of connector 102F, fiber portion 118G of connector 102C is interfaced with and communicatively coupled to fiber portion 118E of connector 102E, fiber portion 118H of connector 102C is interfaced with and communicatively coupled to fiber portion 118F of connector 102E, fiber portion 118A of connector 102D is interfaced with and communicatively coupled to fiber portion 118G of connector 102H, fiber portion 118B of connector 102D is interfaced with and communicatively coupled to fiber portion 118H of connector 102H, fiber portion 118C of connector 102D is interfaced with and communicatively coupled to fiber portion 118G of connector 102G, fiber portion 118D of connector 102D is interfaced with and communicatively coupled to fiber portion 118H of connector 102G, fiber portion 118E of connector 102D is interfaced with and communicatively coupled to fiber portion 118G of connector 102F, fiber portion 118F of connector 102D is interfaced with and communicatively coupled to fiber portion 118H of connector 102F, fiber portion 118G of connector 102D is interfaced with and communicatively coupled to fiber portion 118G of connector 102E, and fiber portion 118H of connector 102D is interfaced with and communicatively coupled to fiber portion 118H of connector 102E.

Figure 5:
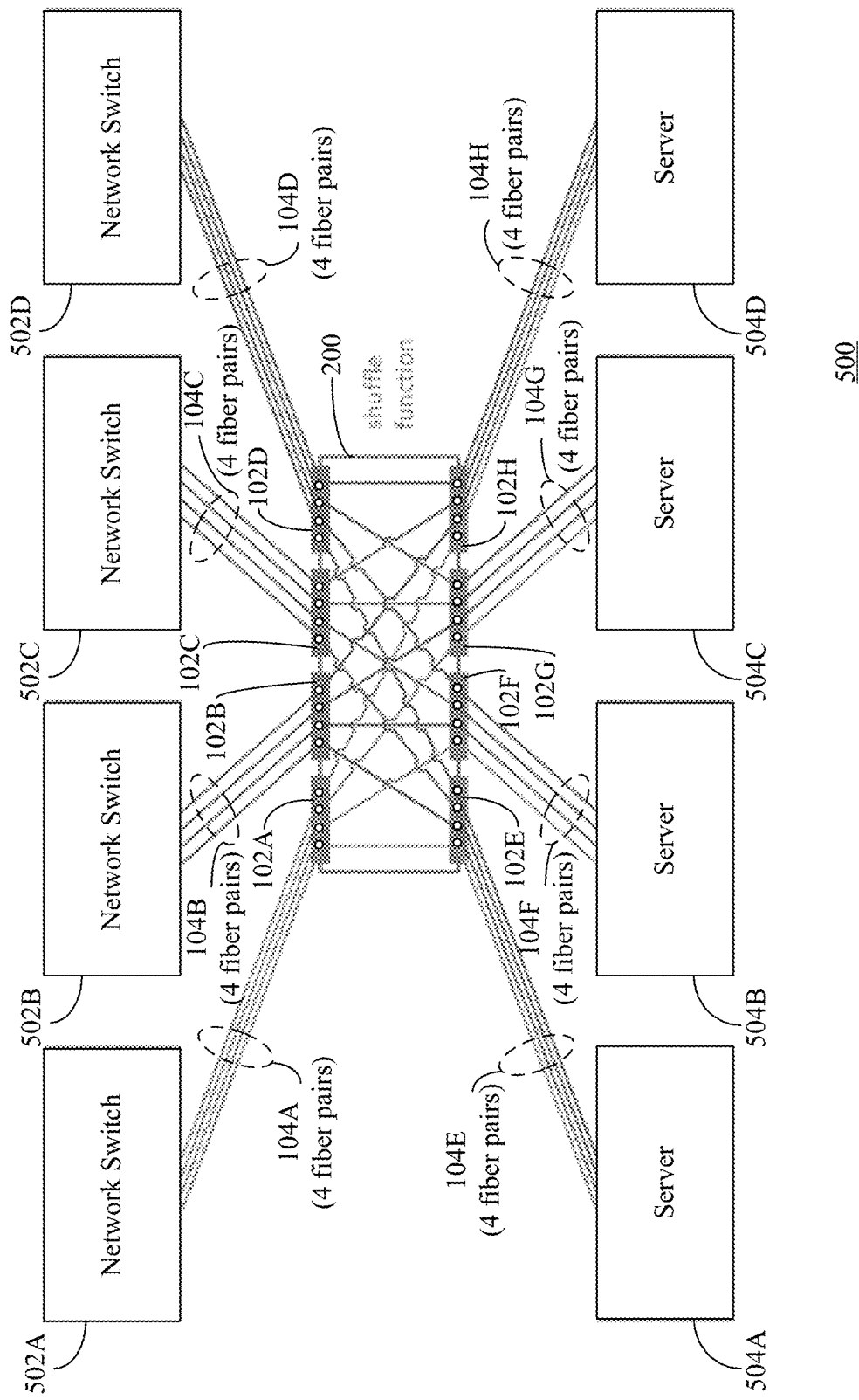
FIG. 5 depicts a block diagram of a system that implements an exemplary shuffle function achieved by a fiber optic adapter housing in accordance with an example embodiment.

Such a configuration advantageously enables a shuffle function in which fibers connected to one device are distributed to multiple other devices. For example, FIG. 5 depicts a block diagram of a system 500 that implements an exemplary shuffle function achieved in accordance with an embodiment. As shown in FIG. 5, system 500 comprises network switches 502A-504D, servers 504A-504D and fiber optic adapter housing 200. As also shown in FIG. 5, connectors 102A-102H are inserted into fiber optic adapter housing 200 in accordance with the embodiments described above with reference to FIGS. 2A-3E. Each of connectors 102A-102H house a respective end of a fiber optic cable. For instance, connector 102A houses a first end of fiber optic cable 104A, connector 102B houses a first end of fiber optic cable 104B, connector 102C houses a first end of fiber optic cable 104C, connector 102D houses a first end of fiber optic cable 104D, connector 102E houses a first end of fiber optic cable 104E, connector 102F houses a first end of fiber optic cable 104F, connector 102G houses a first end of fiber optic cable 104G, and connector 102H houses a first end of fiber optic cable 104H.

A second end of fiber optic cable 104A is coupled to network switch 502A, a second end of fiber optic cable 104B is coupled to network switch 502B, a second end of fiber optic cable 104C is coupled to network switch 502C, a second end of fiber optic cable 104D is coupled to network switch 502D, a second end of fiber optic cable 104E is coupled to server 504A, a second end of fiber optic cable 104F is coupled to server 504B, a second end of fiber optic cable 104G is coupled to server 504C, and a second end of fiber optic cable 104H is coupled to server 504D. The second ends of fiber optic cables 104A-104H may be coupled to their respective devices via a similar connector as connectors 102A-102H or another type of connector (e.g., an MPO connector, an MTP connector, an ST connector, an FC connector, an SC connector, an LC connector, etc.).

Fiber optic cables 104A-104H are examples of fiber optic cable 104, as described above with reference to FIGS. 1A-1G and 3A-3E. Each of fiber optic cables 104A-104H may comprise four fiber transmit/receive pairs. Accordingly, each of fiber optic cables 104A-104H may comprise eight fibers (e.g., fiber portions 118A-118H, as described above with reference to FIGS. 1A-1G, 3A-3E, and 4).

As shown in FIG. 5, fiber optic adapter housing 200 communicatively couples a first fiber pair of fiber optic cable 104A with a first fiber optic pair of fiber optic cable 104E, thereby communicatively coupling network switch 502A with server 504A. Fiber optic adapter housing 200 communicatively couples a second fiber pair of fiber optic cable 104A with a first fiber optic pair of fiber optic cable 104F, thereby communicatively coupling network switch 502A with server 504B. Fiber optic adapter housing 200 communicatively couples a third fiber pair of fiber optic cable 104A with a first fiber optic pair of fiber optic cable 104G, thereby communicatively coupling network switch 502A with server 504C. Fiber optic adapter housing 200 communicatively couples a fourth fiber pair of fiber optic cable 104A with a first fiber optic pair of fiber optic cable 104H, thereby communicatively coupling network switch 502A with server 504D.

Fiber optic adapter housing 200 communicatively couples a first fiber pair of fiber optic cable 104B with a second fiber optic pair of fiber optic cable 104E, thereby communicatively coupling network switch 502B with server 504A. Fiber optic adapter housing 200 communicatively couples a second fiber pair of fiber optic cable 104B with a second fiber optic pair of fiber optic cable 104F, thereby communicatively coupling network switch 502B with server 504B. Fiber optic adapter housing 200 communicatively couples a third fiber pair of fiber optic cable 104B with a second fiber optic pair of fiber optic cable 104G, thereby communicatively coupling network switch 502B with server 504C. Fiber optic adapter housing 200 communicatively couples a fourth fiber pair of fiber optic cable 104B with a second fiber optic pair of fiber optic cable 104H, thereby communicatively coupling network switch 502B with server 504D.

Fiber optic adapter housing 200 communicatively couples a first fiber pair of fiber optic cable 104C with a third fiber optic pair of fiber optic cable 104E, thereby communicatively coupling network switch 502C with server 504A. Fiber optic adapter housing 200 communicatively couples a second fiber pair of fiber optic cable 104C with a third fiber optic pair of fiber optic cable 104F, thereby communicatively coupling network switch 502C with server 504B. Fiber optic adapter housing 200 communicatively couples a third fiber pair of fiber optic cable 104C with a third fiber optic pair of fiber optic cable 104G, thereby communicatively coupling network switch 502C with server 504C. Fiber optic adapter housing 200 communicatively couples a fourth fiber pair of fiber optic cable 104C with a third fiber optic pair of fiber optic cable 104H, thereby communicatively coupling network switch 502C with server 504D.

Fiber optic adapter housing 200 communicatively couples a first fiber pair of fiber optic cable 104D with a fourth fiber optic pair of fiber optic cable 104E, thereby communicatively coupling network switch 502D with server 504A. Fiber optic adapter housing 200 communicatively couples a second fiber pair of fiber optic cable 104D with a fourth fiber optic pair of fiber optic cable 104F, thereby communicatively coupling network switch 502CD with server 504B. Fiber optic adapter housing 200 communicatively couples a third fiber pair of fiber optic cable 104C with a fourth fiber optic pair of fiber optic cable 104G, thereby communicatively coupling network switch 502D with server 504C. Fiber optic adapter housing 200 communicatively couples a fourth fiber pair of fiber optic cable 104D with a fourth fiber optic pair of fiber optic cable 104H, thereby communicatively coupling network switch 502D with server 504D.

In accordance with an embodiment, fiber optic adapter housing 200 supports expanded beam optical lensing. For example, FIGS. 6A-6B depict a fiber optic adapter housing 600 that supports expanded beam optical lensing in accordance with an example embodiment. In particular, FIG. 6A depicts a front view of front face 202 of fiber optic adapter housing 600, and FIG. 6B depicts a rear view of rear face 206 (that opposes front face 202) of fiber optic adapter housing 600. Fiber optic adapter housing 600 is similar to fiber optic adapter housing 200 described above with reference to FIGS. 2A-3E. However, fiber optic adapter housing 600 comprises a mounting plate 222' (in lieu of mounting plate 222) comprising a plurality of apertures for receiving respective lenses of fibers.

For example, as shown in FIGS. 6A and 6B, mounting plate 222' comprises first face 214 and second face 216 that opposes first face 214. Mounting plate 222' comprises a plurality of apertures (or lens apertures) 230A-230H, 232A-232H, 234A-234H, and 236A-236H. Each of apertures 230A-230H, 232A-232H, 234A-234H, and 236A-236H is configured and formed to receive a lens of a respective fiber via first face 214 and formed to receive a lens of a respective fiber via second face 216.

Figure 7A:
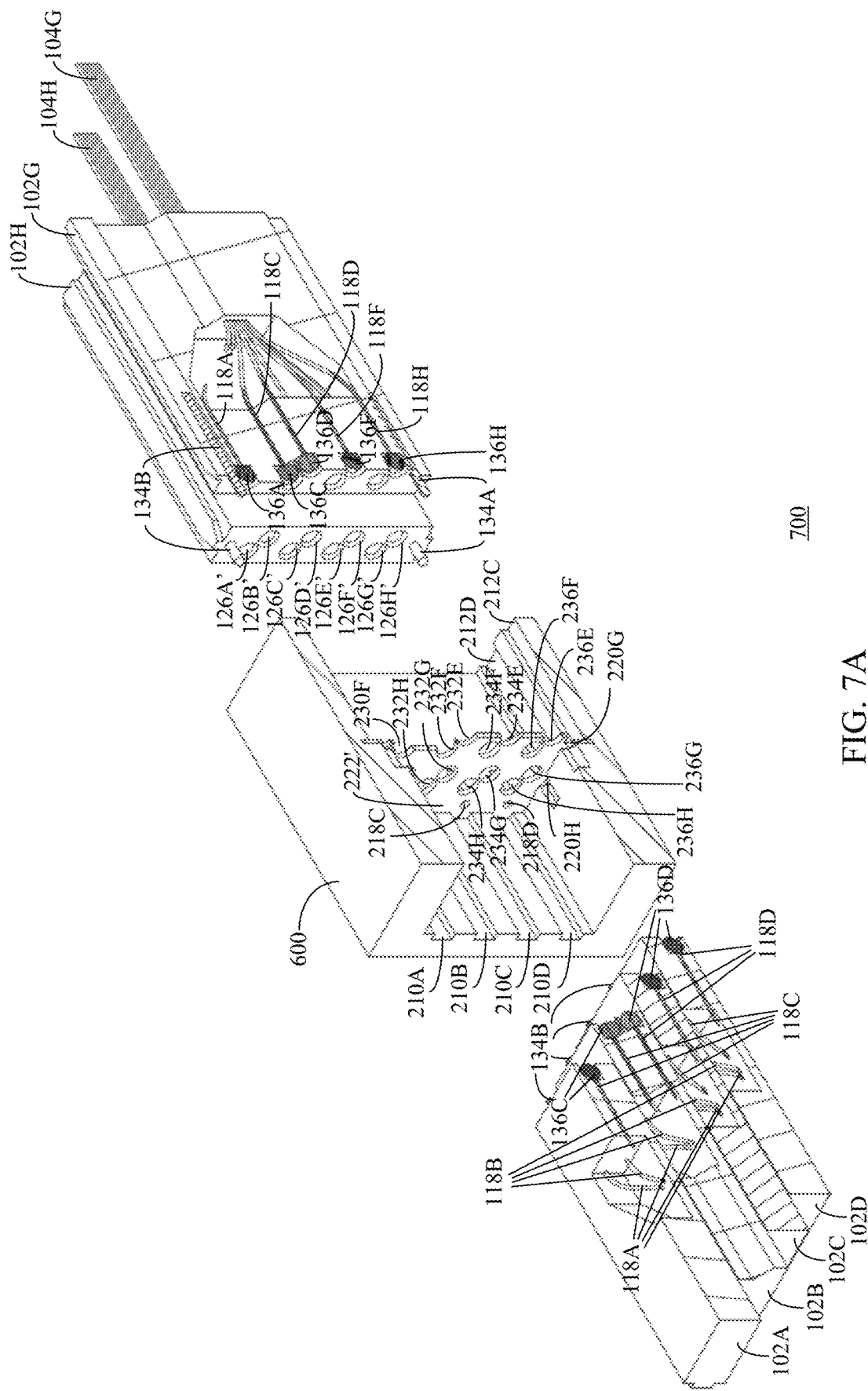
FIG. 7A shows a first cross-sectional perspective view of a system in which connectors are to be received by and inserted into a fiber optic adapter housing that supports expanded beam optical lensing in accordance with an example embodiment.
Figure 7B:
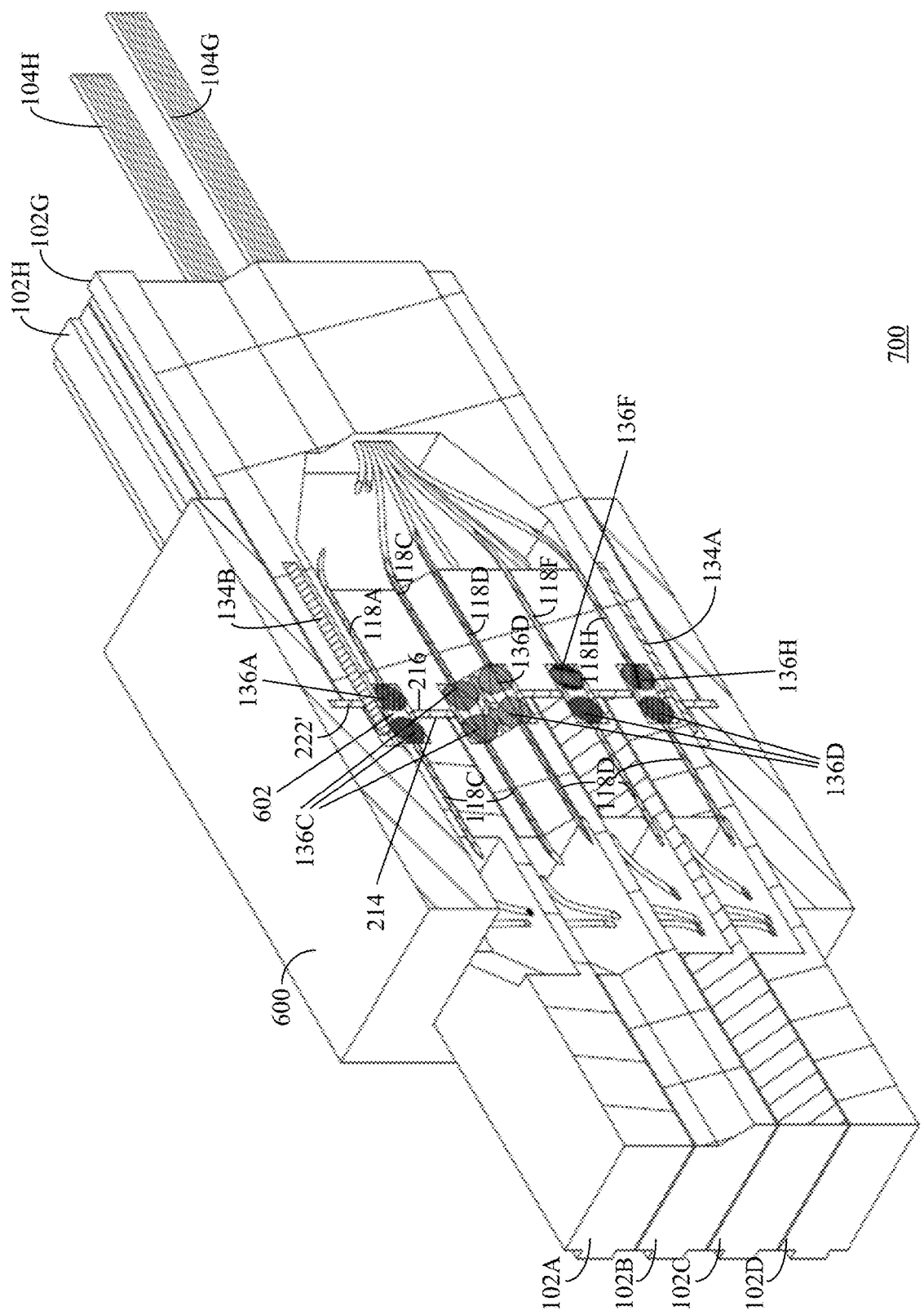
FIG. 7B shows a cross-sectional perspective view of a system in which connectors are received by and inserted into a fiber optic adapter housing that supports expanded beam optical lensing in accordance with an example embodiment.

FIGS. 7A-7B show a system 700 comprising fiber optic adapter housing 600 and a plurality of fiber optic connectors 102A-102H in accordance with example embodiments. In particular, FIG. 7A shows a first cross-sectional perspective view of system 600 in which connectors 102A-102D and connectors 102E-102H are to be received by and inserted into fiber optic adapter housing 600, and FIG. 7B shows a cross-sectional perspective view of system 700 in which connectors 102A-102D and connectors 102G-102H are received by and inserted into fiber optic adapter housing 600. In FIGS. 7A-7B, connectors 102A-102D and connectors 102G-102H comprise a face 106 comprising apertures 126A'-126H', as described above with reference to FIGS. 1F and 1G. As further shown in FIGS. 7A-7B, each of connectors 102A-102D and connectors 102G-102H comprise a lens at the end of the fiber portions comprised therein. For instance, as shown in FIGS. 7A, respective ends of fiber portions 118A comprise a lens 136A, respective ends of fiber portions 118B comprise a lens 136B, respective ends of fiber portions 118C comprise a lens 136C, respective ends of fiber portions 118D comprise a lens 136D, respective ends of fiber portions 118F comprise a lens 136F, and respective ends of fiber portions 118H comprises a lens 136H. It is noted that respective ends of fiber portions 118E and 118G also comprise a lens, which are not visible due to the cross-sectional nature of the view depicted in FIGS. 7A-7B.

As shown in FIG. 7A, connector 102A of a first fiber optic cable assembly is to be received by and inserted into slot 210A, connector 102B of a second fiber optic cable assembly is to be received by and inserted into slot 210B, connector 102C of a third fiber optic cable assembly is to be received by and inserted into slot 210C, and connector 102D of a fourth fiber optic cable assembly is to be received by and inserted into slot 210D. Similarly, connector 102G of a fifth fiber optic cable assembly is to be received by and inserted into slot 212C, and a connector 102H of a sixth fiber optic cable assembly is to be received and inserted into slot 212D. Additional connectors that are to be received and inserted into slots 212A and 212B (not visible) are not shown due the cross-sectional nature of view depicted in FIG. 7A.

When inserting connectors 102A-102D into respective slots 210A-210D, protruding members (e.g., protruding members 134B) of connectors 102A-102D are inserted into corresponding apertures (e.g., apertures 218C and 218D) of mounting plate 222'. For example, as shown in FIG. 7A, protruding member 134B of connector 102C is inserted into aperture 218C of mounting plate 222', and protruding member 134B of connector 102D is inserted into aperture 218D of mounting plate 222'. The apertures in which protruding members 134A of connectors 102A-102D and protruding members 134B of connectors 102A and 102B are not visible in the view depicted in FIG. 7A. When inserting connectors 102G-102H into respective slots 212C-212D, protruding members (e.g., protruding members 134A and 134B) of connectors 102G-102H are inserted into corresponding apertures of mounting plate 222'. For example, as shown in FIG. 7A, protruding member 134A of connector 102G is inserted into aperture 220G of mounting plate 222', and protruding member 134A of connector 102H is inserted into aperture 220H of mounting plate 222'. The apertures in which protruding members 134 of connectors 102G and 102H are not visible in the view depicted in FIG. 7A.

As shown in FIG. 7B, connectors 102A-102D have been inserted into corresponding slots 210A-210D (not visible) and connectors 102E-102H have been inserted into corresponding slots 212A-212D (not visible). As further shown in FIG. 7B, connectors 102A-102D have been inserted into slots 210A-210D in accordance with a first orientation (e.g., a horizontal orientation), and connectors 102E-102H have been inserted into slots 212A-212D in accordance with a second orientation that is orthogonal to the first orientation (e.g., a vertical orientation).

As shown in FIG. 7B, respective lenses of fiber portions 118A-118H are interfaced with (e.g., physically contacting) respective sides of mounting plate 222'. As visible in FIG. 7B, lens 136A of fiber portion 118C of connector 102A is interfaced with first side 214 of mounting plate 222', lens 136C of fiber portion 118C of connector 102B is interfaced with first side 214 of mounting plate 222', lens 136D of fiber portion 118D of connector 102B is interfaced with first side 214 of mounting plate 222', lens 136D of fiber portion 118D of connector 102C is interfaced with first side 214 of mounting plate 222', lens 136D of fiber portion 118D of connector 102D is interfaced with first side 214 of mounting plate 222', lens 136A of fiber portion 118A of connector 102G is interfaced with second side 216 of mounting plate 222', lens 136C of fiber portion 118C of connector 102G is interfaced with second side 216 of mounting plate 222', lens 136D of fiber portion 118D of connector 102G is interfaced with second side 216 of mounting plate 222', lens 136F of fiber portion 118F of connector 102G is interfaced with second side 216 of mounting plate 222', and lens 136H of fiber portion 118H of connector 102G is interfaced with second side 216 of mounting plate 222'.

Fiber portion 118C of connector 102A is communicatively coupled with fiber portion 118A of connector 102G via their respective lenses 136C and 136A. For example, light from fiber portion 118C of connector 102A may be emitted from its lens 136C, travels through an air gap 602 and received by lens 136A of fiber portion 118A of connector 102G (or alternatively, light from fiber portion 118A of connector 102G may be emitted from its lens 136A, travels through air gap 602 and received by lens 136C of fiber portion 118C of connector 102A.

Fiber portion 118C of connector 102B is communicatively coupled with fiber portion 118C of connector 102G via their respective lenses 136C. For example, light from fiber portion 118C of connector 102B may be emitted from its lens 136C, travels through air gap 602 and received by lens 136A of fiber portion 118C of connector 102G (or alternatively, light from fiber portion 118C of connector 102G may be emitted from its lens 136C, travels through air gap 602 and received by lens 136C of fiber portion 118C of connector 102B.

Fiber portion 118D of connector 102B is communicatively coupled with fiber portion 118D of connector 102G via their respective lenses 136D. For example, light from fiber portion 118D of connector 102B may be emitted from its lens 136D, travels through air gap 602 and received by lens 136D of fiber portion 118D of connector 102G (or alternatively, light from fiber portion 118D of connector 102G may be emitted from its lens 136D, travels through air gap 602 and received by lens 136D of fiber portion 118D of connector 102B.

Fiber portion 118D of connector 102C is communicatively coupled with fiber portion 118F of connector 102G via their respective lenses 136D and 136F. For example, light from fiber portion 118D of connector 102C may be emitted from its lens 136D, travels through air gap 602 and received by lens 136F of fiber portion 118F of connector 102G (or alternatively, light from fiber portion 118F of connector 102G may be emitted from its lens 136F, travels through air gap 602 and received by lens 136D of fiber portion 118D of connector 102C.

Fiber portion 118D of connector 102D is communicatively coupled with fiber portion 118H of connector 102G via their respective lenses 136D and 136H. For example, light from fiber portion 118D of connector 102D may be emitted from its lens 136D, travels through air gap 602 and received by lens 136H of fiber portion 118H of connector 102G (or alternatively, light from fiber portion 118H of connector 102G may be emitted from its lens 136H, travels through air gap 602 and received by lens 136D of fiber portion 118D of connector 102D.

III. Additional Example Embodiments

A system is described herein. The system comprises: a fiber optic adapter housing, comprising: a first receptacle comprising a first slot and a second slot each having a first orientation; and a second receptacle comprising a third slot and a fourth slot each having a second orientation that is different than the first orientation, the second receptacle opposing the first receptacle; a first fiber optic connector being housed in the first slot, the first fiber optic connector comprising a plurality of first fiber portions; a second fiber optic connector being housed in the second slot, the second fiber optic connector comprising a plurality of second fiber portions; a third fiber optic connector being housed in the third slot, the third fiber optic connector comprising a plurality of third fiber portions; and a fourth fiber optic connector being housed into the fourth slot, the fourth fiber optic connector comprising a plurality of fourth fiber portions.

In one embodiment of the foregoing system, the first fiber optic connector comprises a first face comprising a first row of first apertures and a second row of second apertures that is adjacent to the first row of first apertures, each first aperture of the first row and each second aperture of the second row configured to receive and house an end of a respective first fiber portion of the plurality of first fiber portions, each first aperture of the first row being diagonally offset from a nearest one or more second apertures of the second row, the second fiber optic connector comprises a second face comprising a third row of third apertures and a fourth row of fourth apertures that is adjacent to the third row of third apertures, each third aperture of the third row and each fourth aperture of the fourth row configured to receive and house an end of a respective second fiber portion of the plurality of second fiber portions, each third aperture of the third row being diagonally offset from a nearest one or more fourth apertures of the fourth row, the third fiber optic connector comprises a third face comprising a fifth row of fifth apertures and a sixth row of sixth apertures that is adjacent to the fifth row of fifth apertures, each fifth aperture of the fifth row and each sixth aperture of the sixth row configured to receive and house an end of a respective third fiber portion of the plurality of third fiber portions, each fifth aperture of the fifth row being diagonally offset from a nearest one or more sixth apertures of the sixth row, and the fourth fiber optic connector comprises a fourth face comprising a seventh row of seventh apertures and an eighth row of eighth apertures that is adjacent to the seventh row of seventh apertures, each seventh aperture of the seventh row and each eighth aperture of the eighth row configured to receive and house an end of a respective fourth fiber portion of the plurality of fourth fiber portions, each seventh aperture of the seventh row being diagonally offset from a nearest one or more eighth apertures of the eighth row.

In one embodiment of the foregoing system, the fiber optic adapter housing communicatively couples a first fiber portion of the plurality of first fiber portions to a first fiber portion of the plurality of third fiber portions, a second fiber portion of the plurality of first fiber portions to a first fiber portion of the plurality of fourth fiber portions, a first fiber portion of the plurality of second fiber portions to a second fiber portion of the plurality of third fibers portions, and a second fiber portion of the plurality of second fiber portions to a second fiber portion of the plurality of fourth fiber portions.

In one embodiment of the foregoing system, each first aperture in the first row is diagonally offset from one of the nearest one or more second apertures of the second row at approximately 45 degrees, each third aperture in the third row is diagonally offset from one of the nearest one or more fourth apertures of the fourth row at approximately 45 degrees, each fifth aperture in the fifth row is diagonally offset from one of the nearest one or more sixth apertures of the sixth row at approximately 45 degrees, and each seventh aperture in the seventh row is diagonally offset from one of the nearest one or more eighth apertures of the eighth row at approximately 45 degrees.

In one embodiment of the foregoing system, a first lateral face of the first fiber optic connector comprises a first keyed portion, the first lateral face being orthogonal to the first face, a second lateral face of the second fiber optic connector comprises a second keyed portion, the second lateral face being orthogonal to the second face, a third lateral face of the third fiber optic connector comprises a third keyed portion, the third lateral face being orthogonal to the third face, and a fourth lateral face of the fourth fiber optic connector comprises a fourth keyed portion, the fourth lateral face being orthogonal to the fourth face.

In one embodiment of the foregoing system, each first aperture of the first row, each second aperture of the second row, each third aperture of the third row, and each fourth aperture of the fourth row houses a first lens, and each fifth aperture of the fifth row, each sixth aperture of the sixth row, each seventh aperture of the seventh row, and each eighth aperture of the eighth row houses a second lens.

In one embodiment of the foregoing system, the fiber optic adapter housing further comprises a mounting plate comprising a first face and a second face opposing the first face, the mounting plate comprising a plurality of ninth rows of ninth apertures, each ninth aperture of the plurality of ninth rows formed to receive: a respective first lens of the first lenses via the first face, and a respective second lens of the second lenses via the second face.

In one embodiment of the foregoing system, each ninth aperture of a particular row of the plurality of ninth rows is diagonally offset from a nearest one or more ninth apertures of a ninth row that is adjacent to the particular row.

In one embodiment of the foregoing system, the fiber optic adapter housing further comprises a mounting plate comprising a first face and a second face opposing the first face, the mounting plate comprising a plurality of first lens apertures and a plurality of second lens apertures, each first lens aperture of the plurality of first lens apertures formed to: receive a first protruding member of a respective first fiber optic connector of the at least two first fiber optic connectors; and detachably couple the respective first fiber optic connector to the first face of the mounting plate, and each second lens aperture of the plurality of second lens apertures formed to: receive a second protruding member of a respective second fiber optic connector of the at least two second fiber optic connectors; and detachably couple the respective second fiber optic connector to the second face of the mounting plate.

In one embodiment of the foregoing system, the first orientation is orthogonal to the second orientation.

A fiber optic cable assembly is also described. The fiber optic cable assembly comprises: a connector body comprising a face; a portion of a fiber optic cable housed in the connector body, the portion of the fiber optic cable comprising a plurality of fiber portions, the face comprising a first row of first apertures and a second row of second apertures that is adjacent to the first row of apertures, each first aperture of the first row configured to receive and house a first end of a respective fiber portion of the plurality of fiber portions, each first aperture of the first row being diagonally offset from a nearest one or more second apertures of the second row.

In one embodiment of the foregoing fiber optic cable assembly, each first aperture in the first row is diagonally offset from one of the nearest one or more nearest second apertures of the second row at approximately 45 degrees.

In one embodiment of the foregoing fiber optic cable assembly, further comprising at least one guide pin protruding outward from the face.

In one embodiment of the foregoing fiber optic cable assembly, at least one lateral face of the connector body comprises a keyed portion, the lateral face being orthogonal to the face.

In one embodiment of the foregoing fiber optic cable assembly, the keyed portion comprises a raised portion that extends along the lateral face.

In one embodiment of the foregoing fiber optic cable assembly, further comprising a plurality of lenses, wherein a respective first end of each fiber portion of the plurality of fiber portions comprises a respective lens of the plurality of lenses, and wherein each first aperture of the first row and each second aperture of the second row is configured to receive and house a respective lens of the plurality of lenses.

A fiber optic adapter housing is further described. The fiber optic adapter housing comprises: a first receptacle comprising a plurality of first slots, each first slot of the plurality of first slots configured to receive and house a respective first fiber optic connector of a plurality of first fiber optic connectors having a first orientation; and a second receptacle opposing the first receptacle and comprising a plurality of second slots, each second slot of the plurality of second slots configured to receive and house a respective second fiber optic connector of a plurality of second fiber optic connectors having a second orientation that is orthogonal to the first orientation.

In one embodiment of the foregoing fiber optic adapter housing, the fiber optic adapter housing further comprises: a mounting plate comprising a first face and a second face opposing the first face, the mounting plate comprising a plurality of first apertures and a plurality of second apertures, each first aperture of the plurality of first apertures formed to: receive a first protruding member of a respective first fiber optic connector of the plurality of first fiber optic connectors; and detachably couple the respective first fiber optic connector to the first face of the mounting plate, and each second aperture of the plurality of second apertures formed to: receive a second protruding member of a respective second fiber optic connector of the plurality of second fiber optic connectors; and detachably couple the respective second fiber optic connector to the second face of the mounting plate.

In one embodiment of the foregoing fiber optic adapter housing, the mounting plate comprises: a plurality of third rows of third apertures each formed to receive: a respective first lens, of a respective first fiber optic connector of the plurality of first fiber optic connectors, via the first face, and a respective second lens, of a respective second fiber optic connector of the plurality of second fiber optic connectors, via the second face.

In one embodiment of the foregoing fiber optic adapter housing, each third aperture of a particular row of the plurality of third rows is diagonally offset from one or more nearest third apertures of a row adjacent, to the particular row, of the plurality of third rows.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
a fiber optic adapter housing, comprising:
a first receptacle comprising a first slot and a second slot each having a first orientation; and
a second receptacle comprising a third slot and a fourth slot each having a second orientation that is different than the first orientation, the second receptacle opposing the first receptacle;
a first fiber optic connector being housed in the first slot, the first fiber optic connector comprising a plurality of first fiber portions;
a second fiber optic connector being housed in the second slot, the second fiber optic connector comprising a plurality of second fiber portions;
a third fiber optic connector being housed in the third slot, the third fiber optic connector comprising a plurality of third fiber portions; and
a fourth fiber optic connector being housed into the fourth slot, the fourth fiber optic connector comprising a plurality of fourth fiber portions.

2. The system of claim 1, wherein the first fiber optic connector comprises a first face comprising a first row of first apertures and a second row of second apertures that is adjacent to the first row of first apertures, each first aperture of the first row and each second aperture of the second row configured to receive and house an end of a respective first fiber portion of the plurality of first fiber portions, each first aperture of the first row being diagonally offset from a nearest one or more second apertures of the second row,
wherein the second fiber optic connector comprises a second face comprising a third row of third apertures and a fourth row of fourth apertures that is adjacent to the third row of third apertures, each third aperture of the third row and each fourth aperture of the fourth row configured to receive and house an end of a respective second fiber portion of the plurality of second fiber portions, each third aperture of the third row being diagonally offset from a nearest one or more fourth apertures of the fourth row,
wherein the third fiber optic connector comprises a third face comprising a fifth row of fifth apertures and a sixth row of sixth apertures that is adjacent to the fifth row of fifth apertures, each fifth aperture of the fifth row and each sixth aperture of the sixth row configured to receive and house an end of a respective third fiber portion of the plurality of third fiber portions, each fifth aperture of the fifth row being diagonally offset from a nearest one or more sixth apertures of the sixth row, and
wherein the fourth fiber optic connector comprises a fourth face comprising a seventh row of seventh apertures and an eighth row of eighth apertures that is adjacent to the seventh row of seventh apertures, each seventh aperture of the seventh row and each eighth aperture of the eighth row configured to receive and house an end of a respective fourth fiber portion of the plurality of fourth fiber portions, each seventh aperture of the seventh row being diagonally offset from a nearest one or more eighth apertures of the eighth row.

3. The system of claim 2, wherein the fiber optic adapter housing communicatively couples a first fiber portion of the plurality of first fiber portions to a first fiber portion of the plurality of third fiber portions, a second fiber portion of the plurality of first fiber portions to a first fiber portion of the plurality of fourth fiber portions, a first fiber portion of the plurality of second fiber portions to a second fiber portion of the plurality of third fibers portions, and a second fiber portion of the plurality of second fiber portions to a second fiber portion of the plurality of fourth fiber portions.

4. The system of claim 2, wherein each first aperture in the first row is diagonally offset from one of the nearest one or more second apertures of the second row at approximately 45 degrees,
  wherein each third aperture in the third row is diagonally offset from one of the nearest one or more fourth apertures of the fourth row at approximately 45 degrees,
  wherein each fifth aperture in the fifth row is diagonally offset from one of the nearest one or more sixth apertures of the sixth row at approximately 45 degrees, and
  wherein each seventh aperture in the seventh row is diagonally offset from one of the nearest one or more eighth apertures of the eighth row at approximately 45 degrees.

5. The system of claim 2, wherein a first lateral face of the first fiber optic connector comprises a first keyed portion, the first lateral face being orthogonal to the first face,
  wherein a second lateral face of the second fiber optic connector comprises a second keyed portion, the second lateral face being orthogonal to the second face,
  wherein a third lateral face of the third fiber optic connector comprises a third keyed portion, the third lateral face being orthogonal to the third face, and
  wherein a fourth lateral face of the fourth fiber optic connector comprises a fourth keyed portion, the fourth lateral face being orthogonal to the fourth face.

6. The system of claim 2, wherein each first aperture of the first row, each second aperture of the second row, each third aperture of the third row, and each fourth aperture of the fourth row houses a first lens, and
  wherein each fifth aperture of the fifth row, each sixth aperture of the sixth row, each seventh aperture of the seventh row, and each eighth aperture of the eighth row houses a second lens.

7. The system of claim 6, wherein the fiber optic adapter housing further comprises a mounting plate comprising a first face and a second face opposing the first face, the mounting plate comprising a plurality of ninth rows of ninth apertures, each ninth aperture of the plurality of ninth rows formed to receive:
  a respective first lens of the first lenses via the first face, and
  a respective second lens of the second lenses via the second face.

8. The system of claim 7, wherein each ninth aperture of a particular row of the plurality of ninth rows is diagonally offset from a nearest one or more ninth apertures of a ninth row that is adjacent to the particular row.

9. The system of claim 1, wherein the fiber optic adapter housing further comprises a mounting plate comprising a first face and a second face opposing the first face, the mounting plate comprising a plurality of first lens apertures and a plurality of second lens apertures,
  each first lens aperture of the plurality of first lens apertures formed to:
    receive a first protruding member of a respective first fiber optic connector of the at least two first fiber optic connectors; and
    detachably couple the respective first fiber optic connector to the first face of the mounting plate, and
  each second lens aperture of the plurality of second lens apertures formed to:
    receive a second protruding member of a respective second fiber optic connector of the at least two second fiber optic connectors; and
    detachably couple the respective second fiber optic connector to the second face of the mounting plate.

10. The system of claim 1, wherein the first orientation is orthogonal to the second orientation.

11. A fiber optic cable assembly, comprising:
  a connector body comprising a face; and
  a portion of a fiber optic cable housed in the connector body, the portion of the fiber optic cable comprising a plurality of fiber portions,
  the face comprising an arrangement of a first row of first apertures and a second row of second apertures that is adjacent to the first row of apertures, where each first aperture of the first row and each second aperture of the second row is configured to receive and house a first end of a respective fiber portion of the plurality of fiber portions, and where each first aperture of the first row being diagonally offset from a nearest one or more second apertures of the second row, the arrangement enabling the fiber optic cable assembly to be communicatively coupled to another fiber optic cable assembly that comprises a same arrangement and that is orthogonally oriented with respect to the fiber optic cable assembly.

12. The fiber optic cable assembly of claim 11, wherein each first aperture in the first row is diagonally offset from one of the nearest one or more second apertures of the second row at approximately 45 degrees.

13. The fiber optic cable assembly of claim 11, further comprising at least one guide pin protruding outward from the face.

14. The fiber optic cable assembly of claim 11, wherein at least one lateral face of the connector body comprises a keyed portion, the lateral face being orthogonal to the face.

15. The fiber optic cable assembly of claim 14, wherein the keyed portion comprises a raised portion that extends along the lateral face.

16. The fiber optic cable assembly of claim 11, further comprising a plurality of lenses, wherein a respective first end of each fiber portion of the plurality of fiber portions comprises a respective lens of the plurality of lenses, and wherein each first aperture of the first row and each second aperture of the second row is configured to receive and house a respective lens of the plurality of lenses.

17. A fiber optic adapter housing, comprising:
  a first receptacle comprising a plurality of first slots, each first slot of the plurality of first slots configured to receive and house a respective first fiber optic connector of a plurality of first fiber optic connectors having a first orientation; and
  a second receptacle opposing the first receptacle and comprising a plurality of second slots, each second slot of the plurality of second slots configured to receive and house a respective second fiber optic connector of a plurality of second fiber optic connectors having a second orientation that is orthogonal to the first orientation;
  wherein each of the first fiber optic connectors and second fiber optic connectors have a face with an identical arrangement of face apertures that house corresponding ends of respective fiber optic cables.

18. The fiber optic adapter housing of claim 17, further comprising:

a mounting plate comprising a first face and a second face opposing the first face, the mounting plate comprising a plurality of first apertures and a plurality of second apertures, each first aperture of the plurality of first apertures formed to:

receive a first protruding member of a respective first fiber optic connector of the plurality of first fiber optic connectors; and detachably couple the respective first fiber optic connector to the first face of the mounting plate, and each second aperture of the plurality of second apertures formed to:

receive a second protruding member of a respective second fiber optic connector of the plurality of second fiber optic connectors; and detachably couple the respective second fiber optic connector to the second face of the mounting plate.

19. The fiber optic adapter housing of claim 18, wherein the mounting plate further comprises:

a plurality of third rows of third apertures each formed to receive:

a respective first lens, of a respective first fiber optic connector of the plurality of first fiber optic connectors, via the first face, and a respective second lens, of a respective second fiber optic connector of the plurality of second fiber optic connectors, via the second face.

20. The fiber optic adapter housing of claim 19, wherein each third aperture of a particular row of the plurality of third rows is diagonally offset from one or more nearest third apertures of a row adjacent, to the particular row, of the plurality of third rows.

* * * * *